(12) United States Patent  
Lipton

(10) Patent No.: US 12,236,546 B1
(45) Date of Patent: Feb. 25, 2025

(54) OBJECT MANIPULATIONS WITH A POINTING DEVICE

(71) Applicant: Apple Inc., Cupertino, CA (US)

(72) Inventor: David A. Lipton, San Mateo, CA (US)

(73) Assignee: Apple Inc., Cupertino, CA (US)

( * ) Notice: Subject to any disclaimer, the term of this patent is extended or adjusted under 35 U.S.C. 154(b) by 261 days.

(21) Appl. No.: 17/407,675

(22) Filed: Aug. 20, 2021

Related U.S. Application Data

(60) Provisional application No. 63/083,022, filed on Sep. 24, 2020.

(51) Int. Cl.
  *G06T 19/20* (2011.01)
  *G06F 3/01* (2006.01)
  *G06T 7/70* (2017.01)

(52) U.S. Cl.
  CPC .............. *G06T 19/20* (2013.01); *G06F 3/011* (2013.01); *G06T 7/70* (2017.01); *G06T 2219/2004* (2013.01); *G06T 2219/2016* (2013.01)

(58) Field of Classification Search
  CPC ... G06T 19/20; G06T 7/70; G06T 2219/2004; G06T 2219/2016; G06F 3/011
  See application file for complete search history.

(56) References Cited

U.S. PATENT DOCUMENTS

| 5,015,188 | A | 5/1991 | Pellosie et al. |
| 5,809,267 | A | 9/1998 | Moran et al. |
| 6,167,433 | A | 12/2000 | Maples et al. |
| 6,295,069 | B1 | 9/2001 | Shirur |
| 6,426,745 | B1 | 7/2002 | Isaacs et al. |

(Continued)

FOREIGN PATENT DOCUMENTS

| EP | 3118722 A1 | 1/2017 |
| GB | 2540791 A | 2/2017 |

(Continued)

OTHER PUBLICATIONS

GamedDBharat, "I want to rotate a object on double tap, Can any One help me with this?", posted on Jul. 26, 2017. https://discussions.unity.com/t/i-want-to-rotate-a-object-on-double-tap-can-any-one-help-me-with-this/192010 (Year: 2017).*

(Continued)

*Primary Examiner* — Chong Wu
(74) *Attorney, Agent, or Firm* — Kubota & Basol LLP

(57) ABSTRACT

An extended reality environment includes one or more virtual objects. A virtual object can be selected for manipulation by orienting a pointing device towards the virtual object and performing a selection input. In some embodiments, if the selection input is a first type of selection gesture received at the pointing device, the virtual object is selected for movement operations. In some embodiments, if the selection input is a second type of selection gesture received at the pointing device, the virtual object is selected for rotation operations. While the virtual object is selected for movement or rotation operations, the virtual object moves or rotates in accordance with the movement or rotation of the user's hand, respectively. In some embodiments, the virtual object has a first visual characteristic when the pointing device is pointing towards the virtual object and has a second visual characteristic when the virtual object is selected.

20 Claims, 10 Drawing Sheets

(56) References Cited

U.S. PATENT DOCUMENTS

| | | |
|---|---|---|
| 6,750,873 B1 | 6/2004 | Bernardini et al. |
| 7,298,370 B1 | 11/2007 | Middler et al. |
| 9,294,757 B1 | 3/2016 | Lewis et al. |
| 9,298,334 B1 | 3/2016 | Zimmerman et al. |
| 9,383,189 B2 | 7/2016 | Bridges et al. |
| 9,396,580 B1 | 7/2016 | Nowrouzezahrai et al. |
| 9,519,371 B2 | 12/2016 | Nishida |
| 10,488,941 B2 | 11/2019 | Lam et al. |
| 10,642,368 B2 | 5/2020 | Chen |
| 10,664,043 B2 | 5/2020 | Ikuta et al. |
| 10,671,241 B1 | 6/2020 | Jia et al. |
| 10,691,216 B2 | 6/2020 | Geisner et al. |
| 10,762,716 B1 | 9/2020 | Paul et al. |
| 10,846,864 B2 | 11/2020 | Kim et al. |
| 11,138,798 B2 | 10/2021 | Paul et al. |
| 11,204,678 B1 * | 12/2021 | Baker ............... G06F 3/04842 |
| 11,249,556 B1 | 2/2022 | Schwarz et al. |
| 11,262,885 B1 | 3/2022 | Burckel |
| 11,340,756 B2 | 5/2022 | Faulkner et al. |
| 11,347,319 B2 | 5/2022 | Goel et al. |
| 11,409,363 B2 | 8/2022 | Chen et al. |
| 11,416,080 B2 | 8/2022 | Heo et al. |
| 11,531,402 B1 | 12/2022 | Stolzenberg |
| 11,531,459 B2 | 12/2022 | Poupyrev et al. |
| 11,557,102 B2 | 1/2023 | Palangie et al. |
| 11,615,596 B2 | 3/2023 | Faulkner et al. |
| 11,641,460 B1 | 5/2023 | Geusz et al. |
| 11,669,155 B2 | 6/2023 | Bowman et al. |
| 11,762,473 B2 | 9/2023 | Cipoletta et al. |
| 11,768,544 B2 | 9/2023 | Schwarz et al. |
| 11,847,748 B2 | 12/2023 | Liu et al. |
| 11,886,643 B2 | 1/2024 | Irie et al. |
| 11,899,845 B2 | 2/2024 | Chung et al. |
| 11,909,453 B2 | 2/2024 | Javaudin et al. |
| 11,914,759 B2 | 2/2024 | Klein et al. |
| 11,928,263 B2 | 3/2024 | Jung et al. |
| 11,983,326 B2 | 5/2024 | Lacey |
| 11,989,965 B2 | 5/2024 | Tarighat Mehrabani |
| 12,032,803 B2 | 7/2024 | Pastrana Vicente et al. |
| 2002/0030692 A1 | 3/2002 | Griesert |
| 2005/0062738 A1 | 3/2005 | Handley et al. |
| 2005/0248299 A1 | 11/2005 | Chemel et al. |
| 2010/0302245 A1 | 12/2010 | Best |
| 2011/0142321 A1 | 6/2011 | Huffman |
| 2012/0113223 A1 | 5/2012 | Hilliges et al. |
| 2012/0170089 A1 | 7/2012 | Kim et al. |
| 2012/0249741 A1 | 10/2012 | Maciocci et al. |
| 2013/0222227 A1 | 8/2013 | Johansson et al. |
| 2013/0321462 A1 | 12/2013 | Salter et al. |
| 2013/0332890 A1 | 12/2013 | Ramic et al. |
| 2014/0040832 A1 | 2/2014 | Regelous |
| 2014/0078176 A1 | 3/2014 | Kim et al. |
| 2014/0104206 A1 | 4/2014 | Anderson |
| 2014/0129990 A1 | 5/2014 | Xin et al. |
| 2014/0333666 A1 | 11/2014 | Poulos et al. |
| 2014/0368620 A1 | 12/2014 | Li et al. |
| 2015/0067580 A1 | 3/2015 | Um et al. |
| 2015/0121466 A1 | 4/2015 | Brands et al. |
| 2015/0123901 A1 | 5/2015 | Schwesinger et al. |
| 2015/0153833 A1 | 6/2015 | Pinault et al. |
| 2015/0317831 A1 | 11/2015 | Ebstyne et al. |
| 2015/0331576 A1 | 11/2015 | Piya et al. |
| 2016/0098093 A1 | 4/2016 | Cheon et al. |
| 2016/0189426 A1 | 6/2016 | Thomas et al. |
| 2016/0225164 A1 | 8/2016 | Tomlin et al. |
| 2016/0291922 A1 | 10/2016 | Montgomerie et al. |
| 2017/0032568 A1 | 2/2017 | Gharpure et al. |
| 2017/0052595 A1 | 2/2017 | Poulos et al. |
| 2017/0053383 A1 | 2/2017 | Heo |
| 2017/0178392 A1 | 6/2017 | Zuccarino et al. |
| 2017/0213388 A1 | 7/2017 | Margolis et al. |
| 2017/0221264 A1 | 8/2017 | Perry |
| 2017/0243352 A1 | 8/2017 | Kutliroff et al. |
| 2017/0251143 A1 | 8/2017 | Peruch et al. |
| 2017/0270715 A1 | 9/2017 | Lindsay et al. |
| 2017/0287215 A1 | 10/2017 | Lalonde et al. |
| 2017/0287225 A1 | 10/2017 | Powderly et al. |
| 2017/0351094 A1 | 12/2017 | Poulos et al. |
| 2018/0005433 A1 | 1/2018 | Kohler et al. |
| 2018/0088787 A1 | 3/2018 | Bereza et al. |
| 2018/0103209 A1 | 4/2018 | Fischler et al. |
| 2018/0122138 A1 | 5/2018 | Piya et al. |
| 2018/0130255 A1 | 5/2018 | Hazeghi et al. |
| 2018/0143693 A1 | 5/2018 | Calabrese et al. |
| 2018/0173404 A1 | 6/2018 | Smith |
| 2018/0197341 A1 | 7/2018 | Loberg et al. |
| 2018/0348986 A1 | 12/2018 | Sawaki |
| 2019/0018479 A1 | 1/2019 | Minami |
| 2019/0018498 A1 | 1/2019 | West et al. |
| 2019/0050062 A1 | 2/2019 | Chen et al. |
| 2019/0130622 A1 | 5/2019 | Hoover et al. |
| 2019/0155495 A1 | 5/2019 | Klein et al. |
| 2019/0164340 A1 | 5/2019 | Pejic et al. |
| 2019/0228589 A1 * | 7/2019 | Dascola ................ G06T 7/70 |
| 2019/0340832 A1 | 11/2019 | Srinivasan et al. |
| 2019/0349575 A1 | 11/2019 | Knepper et al. |
| 2019/0362557 A1 | 11/2019 | Lacey et al. |
| 2020/0005539 A1 | 1/2020 | Hwang et al. |
| 2020/0045249 A1 | 2/2020 | Francois et al. |
| 2020/0048825 A1 | 2/2020 | Schultz et al. |
| 2020/0128227 A1 | 4/2020 | Chavez et al. |
| 2020/0135141 A1 | 4/2020 | Day et al. |
| 2020/0214682 A1 | 7/2020 | Zaslavsky et al. |
| 2020/0286299 A1 | 9/2020 | Wang et al. |
| 2020/0379626 A1 | 12/2020 | Guyomard et al. |
| 2021/0034163 A1 | 2/2021 | Goel et al. |
| 2021/0034319 A1 | 2/2021 | Wang et al. |
| 2021/0225043 A1 | 7/2021 | Tang et al. |
| 2021/0241483 A1 | 8/2021 | Dryer et al. |
| 2021/0279967 A1 | 9/2021 | Gernoth et al. |
| 2021/0295592 A1 | 9/2021 | Von Cramon |
| 2021/0374221 A1 | 12/2021 | Markhasin et al. |
| 2021/0383097 A1 | 12/2021 | Guerard et al. |
| 2022/0083145 A1 | 3/2022 | Matsunaga et al. |
| 2022/0084279 A1 | 3/2022 | Lindmeier et al. |
| 2022/0121344 A1 | 4/2022 | Pastrana Vicente et al. |
| 2022/0148257 A1 | 5/2022 | Boubekeur et al. |
| 2022/0253136 A1 | 8/2022 | Holder et al. |
| 2022/0317776 A1 | 10/2022 | Sundstrom et al. |
| 2022/0326837 A1 | 10/2022 | Dessero et al. |
| 2022/0335697 A1 | 10/2022 | Harding et al. |
| 2022/0382385 A1 | 12/2022 | Chen et al. |
| 2022/0397962 A1 | 12/2022 | Goel et al. |
| 2022/0408164 A1 | 12/2022 | Lee et al. |
| 2022/0413691 A1 | 12/2022 | Becker et al. |
| 2022/0414975 A1 | 12/2022 | Becker et al. |
| 2022/0415094 A1 | 12/2022 | Kim et al. |
| 2023/0027040 A1 | 1/2023 | Wang et al. |
| 2023/0030699 A1 | 2/2023 | Zion et al. |
| 2023/0031832 A1 | 2/2023 | Lipton et al. |
| 2023/0032771 A1 | 2/2023 | Zion et al. |
| 2023/0076326 A1 | 3/2023 | Xu et al. |
| 2023/0103161 A1 | 3/2023 | Li et al. |
| 2023/0119162 A1 | 4/2023 | Lipton et al. |
| 2023/0152935 A1 | 5/2023 | Mckenzie et al. |
| 2023/0168745 A1 | 6/2023 | Yoda |
| 2023/0290042 A1 | 9/2023 | Casella et al. |
| 2023/0377259 A1 | 11/2023 | Becker et al. |
| 2023/0377299 A1 | 11/2023 | Becker et al. |
| 2023/0377300 A1 | 11/2023 | Becker et al. |
| 2024/0037886 A1 | 2/2024 | Chiu et al. |
| 2024/0103636 A1 | 3/2024 | Lindmeier et al. |
| 2024/0104875 A1 | 3/2024 | Couche et al. |
| 2024/0104876 A1 | 3/2024 | Couche et al. |
| 2024/0233097 A1 | 7/2024 | Ngo et al. |

FOREIGN PATENT DOCUMENTS

| | | |
|---|---|---|
| KR | 10-2014-0097654 A | 8/2014 |
| KR | 10-2017-0027240 A | 3/2017 |
| KR | 10-2018-0102171 A | 9/2018 |
| KR | 10-2020-0110788 A | 9/2020 |
| KR | 10-2020-0135496 A | 12/2020 |

(56) References Cited

FOREIGN PATENT DOCUMENTS

| WO | 2019/172678 A1 | 9/2019 |
|---|---|---|
| WO | 2019/213111 A1 | 11/2019 |
| WO | 2022/147146 A1 | 7/2022 |

OTHER PUBLICATIONS

Cas and Chary XR, "Oculus Go & Your Phone As 2nd Controller!—An Inexpensive Way To Play PC VR Games", posted on Mar. 8, 2019. https://www.youtube.com/watch?v=i_iRVa0kemw (Year: 2019).*
Adding Environments, Available online at: https://manual.keyshot.com/manual/environments/adding-environments/, [retrieved on Jun. 9, 2023], 2 pages.
Area Light, Available online at: https://manual.keyshot.com/manual/materials/material-types/light-sources/area-light/, [retrieved on Jun. 9, 2023], 24 pages.
Artec Leo Full 3D Scanning Demo w/ Sample Data, Digitize Designs, LLC, Available online at: <https://www.youtube.com/watch?v=ecBKo_h3Pug>, [retrieved on Sep. 1, 2022], Feb. 22, 2019, 3 pages.
Ex Parte Quayle Action received for U.S. Appl. No. 17/655,347, mailed on Jul. 8, 2024, 6 pages.
Feature Highlights, Available online at: https://manual.keyshot.com/manual/whats-new/feature-highlights/, [retrieved on Jun. 9. 2023], 28 pages.
Final Office Action received for U.S. Appl. No. 17/469,788, mailed on Nov. 16, 2023, 24 pages.
Final Office Action received for U.S. Appl. No. 17/807,226, mailed on Nov. 30, 2023, 23 pages.
Final Office Action received for U.S. Appl. No. 17/812,965, mailed on Jan. 31, 2024, 9 pages.
International Search Report received for PCT Patent Application No. PCT/US2021/049520, mailed on Apr. 8, 2022, 8 pages.
International Search Report received for PCT Patent Application No. PCT/US2022/071208, mailed on Aug. 18, 2022, 9 pages.
International Search Report received for PCT Patent Application No. PCT/US2023/074955, mailed on Feb. 1, 2024, 6 pages.
Light Manager, Available online at: https://manual.keyshot.com/manual/lighting/lighting-manager/, [retrieved on Jun. 9, 2023], 3 pages.
Non-Final Office Action received for U.S. Appl. No. 17/469,788, mailed on Mar. 2, 2023, 22 pages.
Non-Final Office Action received for U.S. Appl. No. 17/469,788, mailed on Mar. 21, 2024, 24 pages.
Non-Final Office Action received for U.S. Appl. No. 17/807,226, mailed on Jun. 26, 2023, 21 pages.
Non-Final Office Action received for U.S. Appl. No. 17/812,965, mailed on Jun. 8, 2023, 8 pages.
Non-Final Office Action received for U.S. Appl. No. 17/814,455, mailed on Feb. 16, 2024, 24 pages.
Non-Final Office Action received for U.S. Appl. No. 17/814,462, mailed on Feb. 1, 2024, 30 pages.
Non-Final Office Action received for U.S. Appl. No. 17/905,483, mailed on Mar. 27, 2024, 16 pages.
Non-Final Office Action received for U.S. Appl. No. 18/317,893, mailed on Apr. 25, 2024, 18 pages.
Notice of Allowance received for U.S. Appl. No. 17/807,226, mailed on Jul. 3, 2024, 9 pages.
Notice of Allowance received for U.S. Appl. No. 17/807,236, mailed on Feb. 5, 2024, 13 pages.
Notice of Allowance received for U.S. Appl. No. 17/807,236, mailed on Jul. 10, 2024, 9 pages.
Notice of Allowance received for U.S. Appl. No. 18/317,893, mailed on Mar. 6, 2024, 8 pages.
Notice of Allowance received for U.S. Appl. No. 18/317,893, mailed on Nov. 22, 2023, 9 pages.
Restriction Requirement received for U.S. Appl. No. 17/905,483, mailed on Dec. 7, 2023, 7 pages.
Search Report received for United Kingdom Patent Application No. GB2210885.6, mailed on Jan. 27, 2023, 1 page.
Locher et al., "Mobile Phone and Cloud—a Dream Team for 3D Reconstruction", 2016 IEEE Winter Conference on Applications of Computer Vision (WACV), 2016, pp. 1-8.
Ro et al., "AR Pointer: Advanced Ray-Casting Interface Using Laser Pointer Metaphor for Object Manipulation in 3D Augmented Reality Environment", Applied Sciences, vol. 9, No. 3078, [retrieved on Jul. 27, 2020], Jul. 30, 2019, 18 pages.
Slambekova, Dana, "Gaze and Gesture Based Object Interaction in Virtual World", [retrieved on Dec. 17, 2017]. Retrieved from the Internet: <URL:https://www.cs.rit.edu/~dxs4659/Report.pdf>, May 31, 2012, 54 pages.
Final Office Action received for U.S. Appl. No. 17/814,462, mailed on Nov. 1, 2024, 44 pages.
Notice of Allowance received for U.S. Appl. No. 17/469,788, mailed on Oct. 15, 2024, 7 pages.
Notice of Allowance received for U.S. Appl. No. 17/655,347, mailed on Oct. 9, 2024, 7 pages.
Notice of Allowance received for U.S. Appl. No. 17/812,965, mailed on Jul. 26, 2024, 6 pages.
Notice of Allowance received for U.S. Appl. No. 17/812,965, mailed on Nov. 15, 2024, 6 pages.
Notice of Allowance received for U.S. Appl. No. 17/814,455, mailed on Oct. 7, 2024, 10 pages.
Notice of Allowance received for U.S. Appl. No. 18/473,180, mailed on Aug. 22, 2024, 13 pages.

* cited by examiner

OBJECT MANIPULATIONS WITH A POINTING DEVICE

CROSS-REFERENCE TO RELATED APPLICATIONS

This application claims the benefit of U.S. Provisional Application No. 63/083,022, filed Sep. 24, 2020, the content of which is incorporated herein by reference in its entirety for all purposes.

FIELD OF THE DISCLOSURE

This relates generally to computer graphics editors.

BACKGROUND OF THE DISCLOSURE

Extended reality (XR) environments provide two-dimensional and/or three-dimensional environments where at least some objects displayed for a user's viewing are generated by a computer. In some uses, a user may create or modify extended reality environments, such as by editing, generating, or otherwise manipulating extended reality objects using a content generation environment, such as a graphics editor or graphics editing interface. Editors that allow for intuitive editing of computer-generated objects are desirable.

SUMMARY OF THE DISCLOSURE

Some embodiments described in this disclosure are directed to selecting and manipulating virtual objects in a content generation environment using a pointing device (e.g., a stylus). In some embodiments, the orientation of the pointing device in physical space determines the virtual object that is selected for input. In some embodiments, a selection input is received via the pointing device while the pointing device is pointed at a respective virtual object and depending on the type of selection input, either a first type of manipulation or a second type of manipulation is performed on the respective virtual object. In some embodiments, the respective virtual object changes visual characteristics based on whether the pointing device is pointed at the virtual object or whether the virtual object has been selected for input.

The full descriptions of the embodiments are provided in the Drawings and the Detailed Description, and it is understood that this Summary does not limit the scope of the disclosure in any way.

BRIEF DESCRIPTION OF THE DRAWINGS

For a better understanding of the various described embodiments, reference should be made to the Detailed Description below, in conjunction with the following drawings in which like reference numerals often refer to corresponding parts throughout the figures.

DETAILED DESCRIPTION

Figure 1:
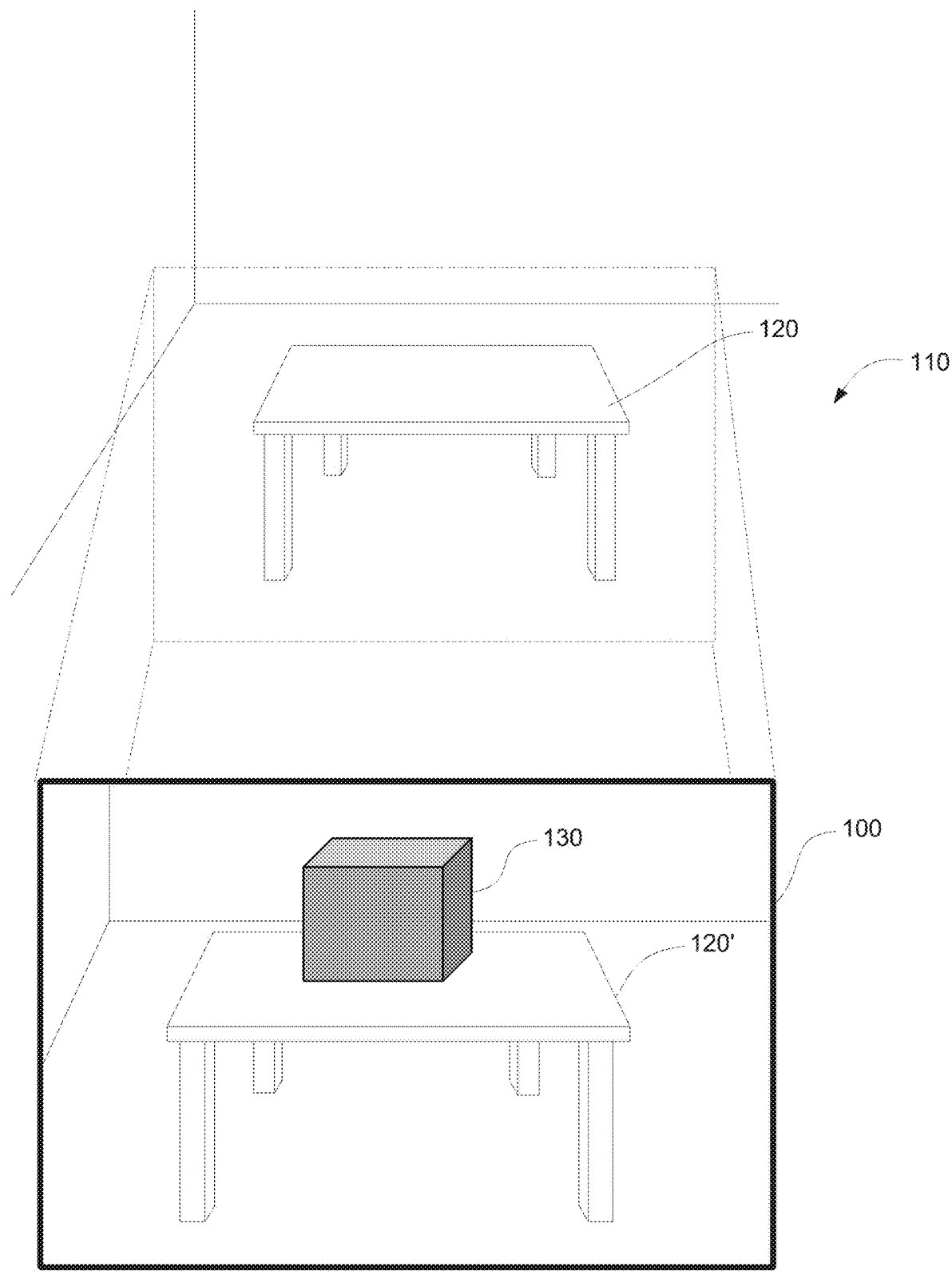
FIG. 1 illustrates an electronic device displaying an extended reality environment according to some embodiments of the disclosure.

In the following description of embodiments, reference is made to the accompanying drawings which form a part hereof, and in which it is shown by way of illustration specific embodiments that are optionally practiced. It is to be understood that other embodiments are optionally used and structural changes are optionally made without departing from the scope of the disclosed embodiments. Further, although the following description uses terms "first," "second," etc. to describe various elements, these elements should not be limited by the terms. These terms are only used to distinguish one element from another. For example, a respective selection input could be referred to as a "first" or "second" selection input, without implying that the respective selection input has different characteristics based merely on the fact that the respective selection input is referred to as a "first" or "second" selection input. On the other hand, a selection input referred to as a "first" selection input and a selection input referred to as a "second" selection input are both selection input, but are not the same selection input, unless explicitly described as such.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

In some embodiments, XR content can be presented to the user via an XR file that includes data representing the XR content and/or data describing how the XR content is to be presented. In some embodiments, the XR file includes data representing one or more XR scenes and one or more triggers for presentation of the one or more XR scenes. For example, a XR scene may be anchored to a horizontal, planar surface, such that when a horizontal, planar surface is detected (e.g., in the field of view of one or more cameras), the XR scene can be presented. The XR file can also include data regarding one or more objects (e.g., virtual objects) associated with the XR scene, and/or associated triggers and actions involving the XR objects.

In order to simplify the generation of XR files and/or editing of computer-generated graphics generally, a computer graphics editor including a content generation environment (e.g., an authoring environment graphical user interface (GUI)) can be used. In some embodiments, a content generation environment is itself a XR environment (e.g., a two-dimensional and/or three-dimensional environment). For example, a content generation environment can include one or more virtual objects and one or more representations of real world objects. In some embodiments, the virtual objects are superimposed over a physical environment, or a representation thereof. In some embodiments, the physical environment is captured via one or more cameras of the electronic device and is actively displayed in the XR environment (e.g., via the display generation component). In some embodiments, the physical environment is (e.g., passively) provided by the electronic device, for example, if the display generation component includes a translucent or transparent element through which the user is able to see the physical environment.

In such a content generation environment, a user can create objects from scratch (including the appearance of the objects, behaviors/actions of the objects, and/or triggers for the behaviors/actions of the objects). Additionally or alternatively, objects can be created by other content creators and imported into the content generation environment, where the objects can be placed into a XR environment or scene. In some embodiments, objects generated in a content generation environment or entire environments can be exported to other environments or XR scenes (e.g., via generating a XR file and importing or opening the XR file in a computer graphics editor application or XR viewer application).

As will be described in further detail below, in some embodiments, the content generation environment can enable a user to perform one or more transformations or manipulations of an object, such as relocating (e.g., moving), rotating, resizing, etc. In some embodiments, a pointing device can be used to select the object of interest. In some embodiments, the type of manipulation to perform on the object of interest can depend on the type of selection input received while the pointing device is pointed at the object of interest. For example, if the device receives a first type of selection input, a first type of manipulation can be performed on the object, but if the device receives a second type of selection input, a second type of manipulation can be performed on the object. In some embodiments, the manipulation on the object is performed in accordance with a change in the pose of the hand of the user and/or the pointing device that is held in the hand of the user. In some embodiments, the visual characteristic of the object of interest can change to indicate that the pointing device is pointed at the object of interest and/or that the object of interest has been selected (e.g., selected for input, selected for manipulation, etc., as a result of receiving a selection input). As used herein, the "pose" of the hand and/or "pose" of the pointing device refers to the position and/or location of the hand or pointing device in space (e.g., which maps to a location in the content generation environment, as will be described in more detail below) and/or the orientation of the hand or pointing device (e.g., absolute orientation with respect to gravity or "down" or relative orientation with respect to other objects). Thus, a change in the pose of the hand can refer to a change in the position of the hand (e.g., a movement of the hand to a new location), a change in the orientation of the hand (e.g., a rotation of the hand), or a combination of both. Further details of object manipulation are described with respect to FIGS. 3-6.

Embodiments of electronic devices and user interfaces for such devices are described. In some embodiments, the device is a portable communications device, such as a laptop or tablet computer. In some embodiments, the device is a mobile telephone that also contains other functions, such as personal digital assistant (PDA) and/or music player functions. In some embodiments, the device is a wearable device, such as a watch, a head-mounted display, etc. It should also be understood that, in some embodiments, the device is not a portable communications device, but is a desktop computer or a television. In some embodiments, the portable and non-portable electronic devices may optionally include touch-sensitive surfaces (e.g., touch screen displays and/or touch pads). In some embodiments, the device does not include a touch-sensitive surface (e.g., a touch screen display and/or a touch pad), but rather is capable of outputting display information (such as the user interfaces of the disclosure) for display on an integrated or external display device, and capable of receiving input information from an integrated or external input device having one or more input mechanisms (such as one or more buttons, a mouse, a touch screen display, stylus, and/or a touch pad). In some embodiments, the device has a display, but is capable of receiving input information from a separate input device having one or more input mechanisms (such as one or more buttons, a mouse, a touch screen display, and/or a touch pad).

In the discussion that follows, an electronic device that is in communication with a display generation component and one or more input devices is described. It should be understood, that the electronic device optionally is in communication with one or more other physical user-interface devices, such as touch-sensitive surface, a physical keyboard, a mouse, a joystick, a hand tracking device, an eye tracking device, a stylus, etc. Further, as described above, it should be understood that the described electronic device, display and touch-sensitive surface are optionally distributed amongst two or more devices. Therefore, as used in this disclosure, information displayed on the electronic device or by the electronic device is optionally used to describe information outputted by the electronic device for display on a separate display device (touch-sensitive or not). Similarly, as used in this disclosure, input received on the electronic device (e.g., touch input received on a touch-sensitive surface of the electronic device, or touch input received on the surface of a stylus) is optionally used to describe input received on a separate input device, from which the electronic device receives input information.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, a television channel browsing application, and/or a digital video player application. Additionally, the device may support an application for generating or editing content for computer generated graphics and/or XR environments (e.g., an application with a content generation environment).

The various applications that are executed on the device optionally use a common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

FIG. 1 illustrates an electronic device 100 displaying an extended reality environment (e.g., a computer-generated environment) according to some embodiments of the disclosure. In some embodiments, electronic device 100 is a hand-held or mobile device, such as a tablet computer, laptop computer, smartphone, or head-mounted display. Examples of device 100 are described below with reference to the architecture block diagram of FIG. 2. As shown in FIG. 1, electronic device 100 and table 120 are located in the physical environment 110. In some embodiments, electronic device 100 may be configured to capture areas of physical environment 110 including table 120 (illustrated in the field of view of electronic device 100). In some embodiments, in response to a trigger, the electronic device 100 may be configured to display an object 130 in the computer-generated environment (e.g., represented by a cube illustrated in FIG. 1) that is not present in the physical environment 110, but is displayed in the computer generated environment positioned on (e.g., anchored to) the top of a computer-generated representation 120' of real-world table 120. For example, object 130 can be displayed on the surface of the table 120' in the computer-generated environment displayed via device 100 in response to detecting the planar surface of table 120 in the physical environment 110. It should be understood that object 130 is a representative object and one or more different objects (e.g., of various dimensionality such as two-dimensional or three-dimensional objects) can be included and rendered in a three-dimensional computer-generated environment. For example, the object can represent an application or a user interface displayed in the computer-generated environment. In some examples, the application or user interface can include the display of content items (e.g., photos, video, etc.) of a content application. Additionally, it should be understood, that the three-dimensional (3D) environment (or 3D object) described herein may be a representation of a 3D environment (or three-dimensional object) displayed in a two dimensional (2D) context (e.g., displayed on a 2D screen).

Figure 2:
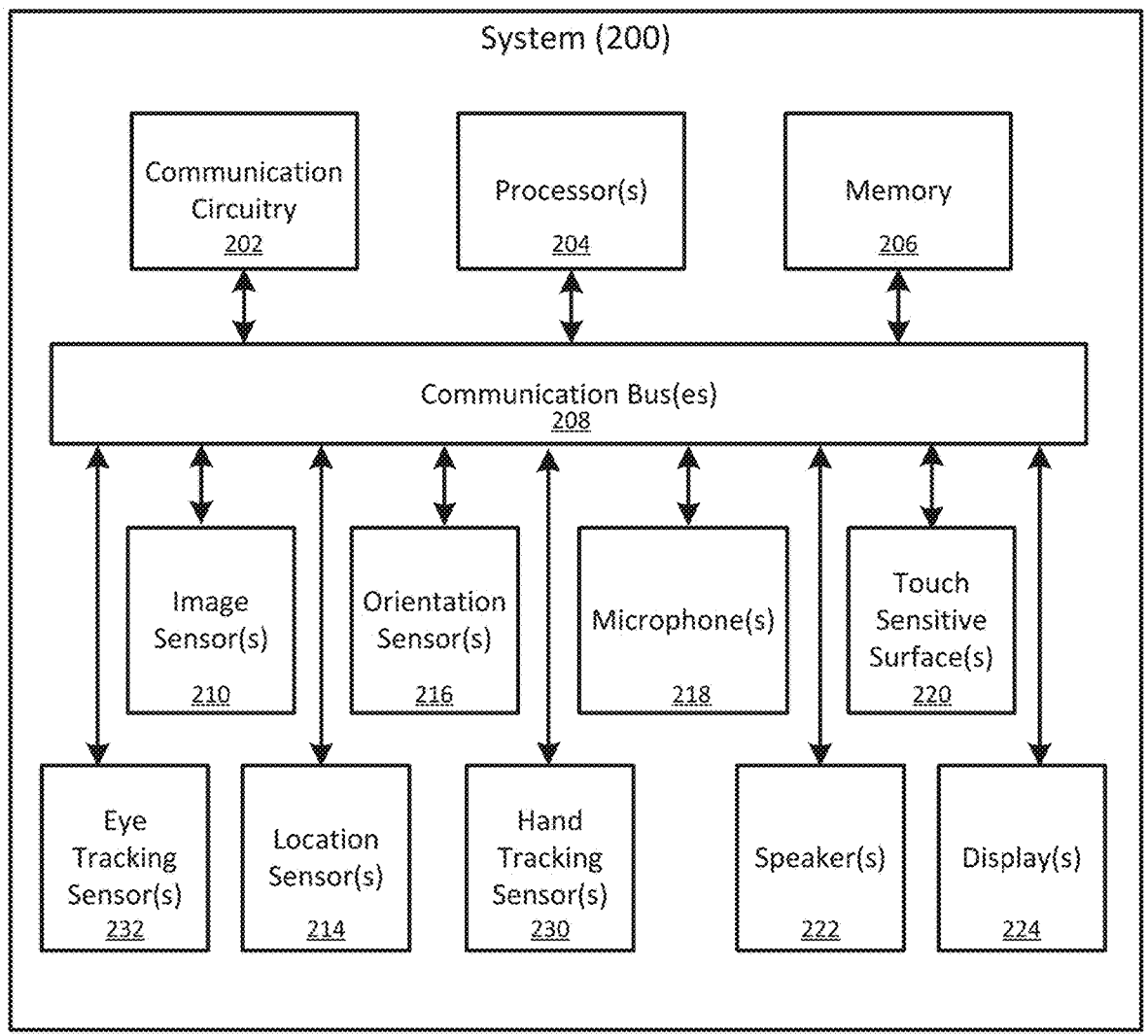
FIG. 2 illustrates a block diagram of an exemplary architecture for a system or device in accordance with some embodiments of the disclosure.

FIG. 2 illustrates a block diagram of an exemplary architecture for a system or device 200 in accordance with some embodiments of the disclosure. In some embodiments, device 200 is a mobile device, such as a mobile phone (e.g., smart phone), a tablet computer, a laptop computer, a desktop computer, a head-mounted display, an auxiliary device in communication with another device, etc. In some embodiments, as illustrated in FIG. 2, device 200 includes various components, such as communication circuitry 202, processor(s) 204, memory 206, image sensor(s) 210, location sensor(s) 214, orientation sensor(s) 216, microphone(s) 218, touch-sensitive surface(s) 220, speaker(s) 222, display generation component(s) 224, hand tracking sensor(s) 230, and/or eye tracking sensor(s) 232. These components optionally communicate over communication bus(es) 208 of device 200.

Device 200 includes communication circuitry 202. Communication circuitry 202 optionally includes circuitry for communicating with electronic devices, networks, such as the Internet, intranets, a wired network and/or a wireless network, cellular networks and wireless local area networks (LANs). Communication circuitry 202 optionally includes circuitry for communicating using near-field communication (NFC) and/or short-range communication, such as Bluetooth®.

Processor(s) 204 include one or more general processors, one or more graphics processors, and/or one or more digital signal processors. In some embodiments, memory 206 a non-transitory computer-readable storage medium (e.g., flash memory, random access memory, or other volatile or non-volatile memory or storage) that stores computer-readable instructions configured to be executed by processor(s) 204 to perform the techniques, processes, and/or methods described below. In some embodiments, memory 206 can including more than one non-transitory computer-readable storage medium. A non-transitory computer-readable storage medium can be any medium (e.g., excluding a signal) that can tangibly contain or store computer-executable instructions for use by or in connection with the instruction execution system, apparatus, or device. In some embodiments, the storage medium is a transitory computer-readable storage medium. In some embodiments, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like.

Device 200 includes display generation component(s) 224. In some embodiments, display generation component(s) 224 include a single display (e.g., a liquid-crystal display (LCD), organic light-emitting diode (OLED), or other types of display). In some embodiments, display generation component(s) 224 includes multiple displays. In some embodiments, display generation component(s) 224 can include a display with touch capability (e.g., a touch screen), a projector, a holographic projector, a retinal projector, etc. In some embodiments, device 200 includes touch-sensitive surface(s) 220 for receiving user inputs, such as tap inputs and swipe inputs or other gestures. In some embodiments, display generation component(s) 224 and touch-sensitive surface(s) 220 form touch-sensitive display(s) (e.g., a touch screen integrated with device 200 or external to device 200 that is in communication with device 200).

Device 200 optionally includes image sensor(s) 210. Image sensors(s) 210 optionally include one or more visible light image sensor, such as charged coupled device (CCD) sensors, and/or complementary metal-oxide-semiconductor (CMOS) sensors operable to obtain images of physical objects from the real-world environment. Image sensor(s) 210 also optionally include one or more infrared (IR) sensors, such as a passive or an active IR sensor, for detecting infrared light from the real-world environment. For example, an active IR sensor includes an IR emitter for emitting infrared light into the real-world environment. Image sensor(s) 210 also optionally include one or more cameras configured to capture movement of physical objects in the real-world environment. Image sensor(s) 210 also optionally include one or more depth sensors configured to detect the distance of physical objects from device 200. In some embodiments, information from one or more depth sensors can allow the device to identify and differentiate objects in the real-world environment from other objects in the real-world environment. In some embodiments, one or more depth sensors can allow the device to determine the texture and/or topography of objects in the real-world environment.

In some embodiments, device 200 uses CCD sensors, event cameras, and depth sensors in combination to detect the physical environment around device 200. In some embodiments, image sensor(s) 220 include a first image sensor and a second image sensor. The first image sensor and the second image sensor work in tandem and are optionally configured to capture different information of physical objects in the real-world environment. In some embodiments, the first image sensor is a visible light image sensor and the second image sensor is a depth sensor. In some embodiments, device 200 uses image sensor(s) 210 to detect the position and orientation of device 200 and/or display generation component(s) 224 in the real-world environment. For example, device 200 uses image sensor(s) 210 to track the position and orientation of display generation component(s) 224 relative to one or more fixed objects in the real-world environment.

In some embodiments, device 200 includes microphones(s) 218 or other audio sensors. Device 200 uses microphone(s) 218 to detect sound from the user and/or the real-world environment of the user. In some embodiments, microphone(s) 218 includes an array of microphones (a plurality of microphones) that optionally operate in tandem, such as to identify ambient noise or to locate the source of sound in space of the real-world environment.

Device 200 includes location sensor(s) 214 for detecting a location of device 200 and/or display generation component(s) 224. For example, location sensor(s) 214 can include a GPS receiver that receives data from one or more satellites and allows device 200 to determine the device's absolute position in the physical world.

Device 200 includes orientation sensor(s) 216 for detecting orientation and/or movement of device 200 and/or display generation component(s) 224. For example, device 200 uses orientation sensor(s) 216 to track changes in the position and/or orientation of device 200 and/or display generation component(s) 224, such as with respect to physical objects in the real-world environment. Orientation sensor(s) 216 optionally include one or more gyroscopes and/or one or more accelerometers.

Device 200 includes hand tracking sensor(s) 230 and/or eye tracking sensor(s) 232, in some embodiments. Hand tracking sensor(s) 230 are configured to track the position/location of one or more portions of the user's hands, and/or motions of one or more portions of the user's hands with respect to the extended reality environment, relative to the display generation component(s) 224, and/or relative to another defined coordinate system. Eye tracking senor(s) 232 are configured to track the position and movement of a user's gaze (eyes, face, or head, more generally) with respect to the real-world or extended reality environment and/or relative to the display generation component(s) 224. In some embodiments, hand tracking sensor(s) 230 and/or eye tracking sensor(s) 232 are implemented together with the display generation component(s) 224. In some embodiments, the hand tracking sensor(s) 230 and/or eye tracking sensor(s) 232 are implemented separate from the display generation component(s) 224.

In some embodiments, the hand tracking sensor(s) 230 can use image sensor(s) 210 (e.g., one or more IR cameras, 3D cameras, depth cameras, etc.) that capture three-dimensional information from the real-world including one or more hands (e.g., of a human user). In some examples, the hands can be resolved with sufficient resolution to distinguish fingers and their respective positions. In some embodiments, one or more image sensor(s) 210 are positioned relative to the user to define a field of view of the image sensor(s) and an interaction space in which finger/hand position, orientation and/or movement captured by the image sensors are used as inputs (e.g., to distinguish from a user's resting hand or other hands of other persons in the real-world environment). Tracking the fingers/hands for input (e.g., gestures) can be advantageous in that it does not require the user to touch, hold or wear any sort of beacon, sensor, or other marker.

In some embodiments, eye tracking sensor(s) 232 includes at least one eye tracking camera (e.g., infrared (IR) cameras) and/or illumination sources (e.g., IR light sources, such as LEDs) that emit light towards a user's eyes. The eye tracking cameras may be pointed towards a user's eyes to receive reflected IR light from the light sources directly or indirectly from the eyes. In some embodiments, both eyes are tracked separately by respective eye tracking cameras and illumination sources, and a focus/gaze can be determined from tracking both eyes. In some embodiments, one eye (e.g., a dominant eye) is tracked by a respective eye tracking camera/illumination source(s).

Device 200 is not limited to the components and configuration of FIG. 2, but can include fewer, other, or additional components in multiple configurations. A person using device 200, is optionally referred to herein as a user of the device. Attention is now directed towards examples of user interfaces ("UI") and associated processes that are implemented on an electronic device, such as device 100 and device 200.

The examples described below provide ways in which an electronic device manipulates an object based on the type of selection input received via a pointing device (e.g., stylus) that is held by a hand of the user. Efficient user interactions improve the speed and accuracy of generating content, thereby improving the creation of XR environments and XR objects (e.g., XR objects). Efficient user interfaces also enhance the user's interactions with the electronic device by reducing the difficulties in the object creation process. Enhancing interactions with a device reduces the amount of time needed by a user to perform operations, and thus reduces the power usage of the device and increases battery life for battery-powered devices. When a person uses a device, that person is optionally referred to as a user of the device.

Figure 3A:
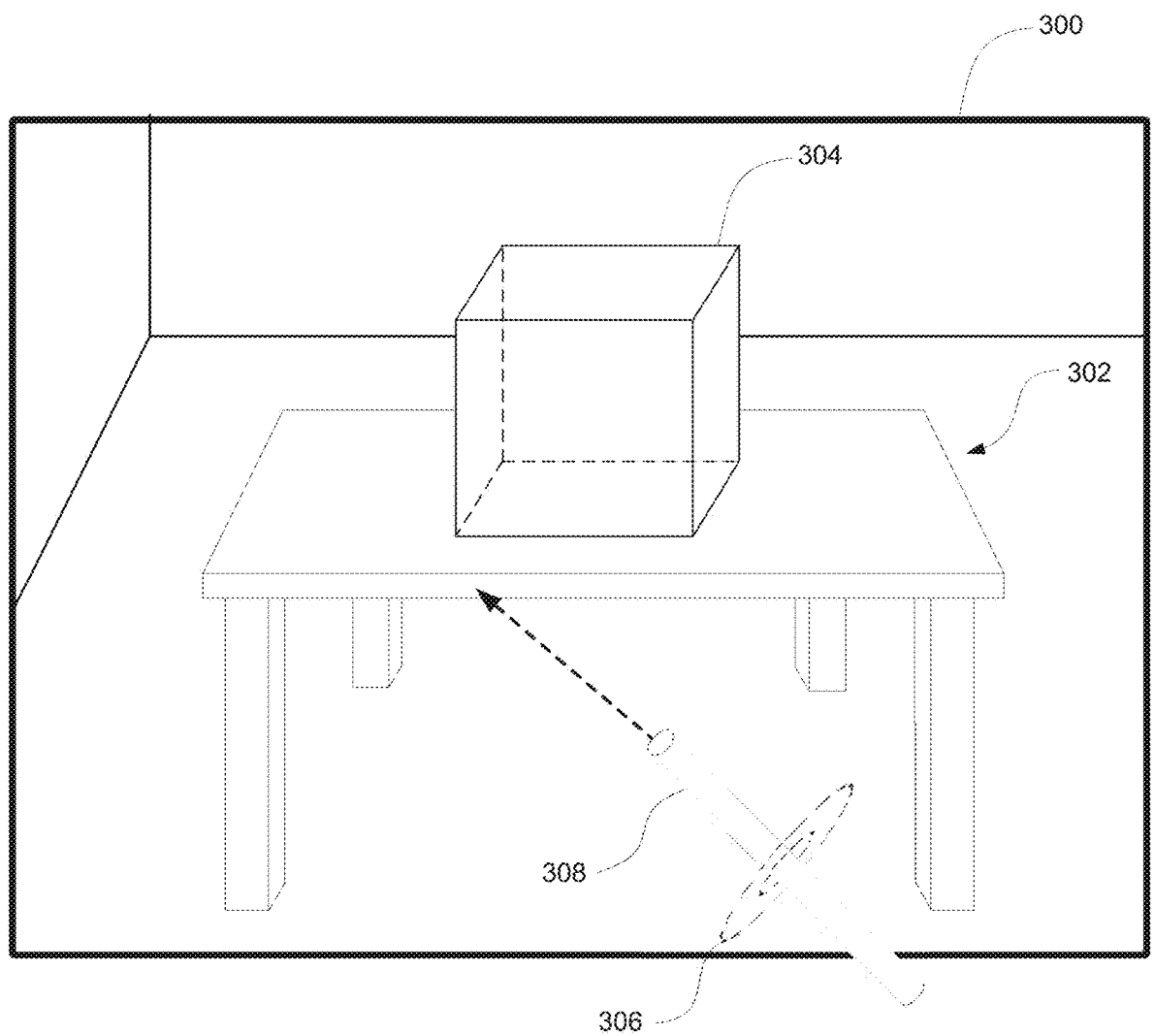
FIGS. 3A-3C illustrate an exemplary method of selecting a virtual object according to embodiments of the disclosure.
Figure 3B:
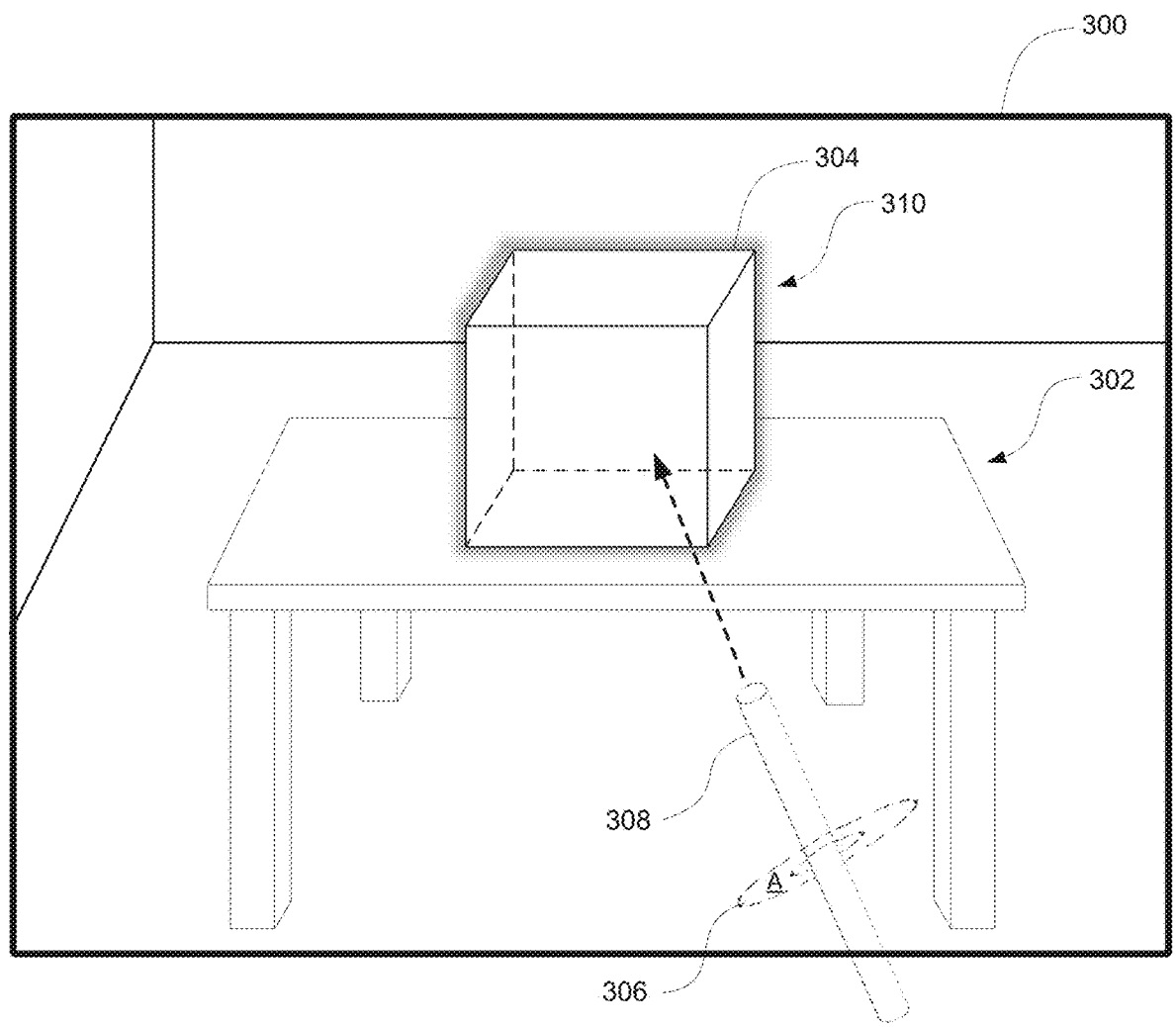

FIGS. 3A-3B illustrate an exemplary method of selecting a virtual object according to embodiments of the disclosure. In FIG. 3A, content generation environment 300 can be displayed by an electronic device (e.g., similar to device 100 or 200). In some embodiments, content generation environment 300 is displayed by a display generation component (e.g., a display device) that is in communication with the device (e.g., integrated with or external to the device), such as a monitor, a touch screen, a projector, a television, head-mounted display, etc. Content generation environment 300 is a user interface of a content editor or content generation application (e.g., a content authoring environment) in which a user is able to generate, modify, edit, or otherwise manipulate virtual objects in one or more XR scenes (e.g., XR environments). For example, after generating and editing virtual objects in a XR scene, the virtual objects can be exported or otherwise saved for use in a XR environment (e.g., for use in a XR environment that is not a content generation environment, such as a XR viewer).

In FIG. 3A, content generation environment 300 includes a simulated three-dimensional environment with one or more objects (e.g., three dimensional or two-dimensional objects). In some embodiments, content generation environment 300 is an XR environment that includes a simulated (e.g., virtual) three-dimensional environment. In some embodiments, one or more of the three-dimensional objects in content generation environment 300 can be either virtual objects (e.g., generated by the device) or real-world objects (e.g., objects in the real world environment around the device that are captured by the device and actively displayed to the user or passively made viewable to the user, for example, via a transparent or translucent display), similarly to described above with respect to FIG. 1. In FIG. 3A, content generation environment 300 includes table 302 and cube 304 (e.g., a three-dimensional cube). In some embodiments, table 302 is a representation of a table in the physical environment (e.g., such as table 120 are located in the physical environment 110 as described above with respect to FIG. 1). In some embodiments, table 302 is a virtual object generated by the electronic device and displayed in content generation environment 300. In some embodiments, cube 304 is a virtual object that exists in content generation environment 300, but does not exist in the physical environment that is captured by the electronic device.

As shown in FIG. 3A, content generation environment 300 includes a representation of a hand 306 holding stylus 308. For ease of illustration, the representation of the hand holding the stylus is represented as a torus. In some embodiments, hand 306 is the hand of the user that is holding stylus 308. As discussed above, content generation environment 300 can be a mixed reality environment such that hand 306 exists in content generation environment 300 and can interact with the objects in content generation environment 300 as if hand 306 were a virtual object in content generation environment 300 (or conversely, hand 306 can interact with virtual objects in content generation environment 300 as if the virtual objects were real objects in the physical environment). Thus, as discussed above, hand 306 holding stylus 308 is viewable to the user in content generation environment 300 via a passive display process (e.g., allowing hand 306 and stylus 308 in the physical world to be viewable via a transparent or translucent display such that it appears as if it is in content generation environment 300) or an active display process (e.g., capturing one or more images of hand 306 and stylus 308 and displaying a representation of hand 306 and stylus 308 in content generation environment 300).

In some embodiments, stylus 308 is a passive pointing device, such as a pointing stick, pencil, pen, etc., or any suitable implement that is capable of indicating interest in an object via the orientation of the implement. In some embodiments, stylus 308 is an active pointing device that optionally includes one or more sensors and communication circuitry that is capable of communicating with the electronic device (e.g., wirelessly, via a one-way communication channel, or a two-way communication channel). In some embodiments, stylus 308 is paired with the electronic device.

The description herein describes embodiments in which a physical object (or representation thereof, such as hand 306 and/or stylus 308) interacts with one or more virtual objects in a content generation environment. As a mixed reality system, the device is optionally able to selectively display portions and/or objects of the physical environment such that the respective portions and/or objects of the physical environment appear as if they exist in the content generation environment displayed by the electronic device. Similarly, the device is optionally able to display virtual objects in the content generation environment to appear as if the virtual objects exist in the real world (e.g., physical environment) by placing the virtual objects at respective locations in the content generation environment that have corresponding locations in the real world. For example, the device optionally displays a virtual cube (e.g., such as cube 304) such that it appears as if a real cube is placed on top of a table in the physical environment. In some embodiments, each location in the content generation environment has a corresponding location in the physical environment. Thus, when the device is described as displaying a virtual object at a respective location with respect to a physical object (e.g., such as a location at or near the hand of the user, or at or near a physical table), the device displays the virtual object at a particular location in the content generation environment such that it appears as if the virtual object is at or near the physical object in the physical world (e.g., the virtual object is displayed at a location in the content generation environment that corresponds to a location in the physical environment at which the virtual object would be displayed if it were a real object at that particular location).

Similarly, a user is optionally able to interact with virtual objects in the content generation environment using one or more hands as if the virtual objects were real objects in the physical environment. Thus, in some embodiments, the hands of the user are displayed at a respective location in the content generation environment and are treated as if they were objects in the content generation environment that are able to interact with the virtual objects in the content generation environment as if they were real physical objects in the physical environment. In some embodiments, a user is able to move his or her hands to cause the representations of the hands in the content generation environment to move in conjunction with the movement of the user's hand.

In some embodiments described below, the device is optionally able to determine whether a pointing device (e.g., stylus 308) is directed to and/or pointed at a virtual object in a content generation environment. In some embodiments, because stylus 308 is a physical object in the physical world and virtual objects exist only in the content generation environment, to determine where and what the pointing device is pointed, the device performs a process of mapping interactions with the physical world to interactions with the content generation environment. For example, the device is able to determine, based on the orientation of the pointing device, that the pointing device is pointed at and/or oriented towards a particular location in the physical environment. Based on this determination, the device is able to map the location in the physical environment at which the pointing device is pointed to its corresponding location in the content generation environment and determine that the pointing device is pointed at and/or oriented towards the determined location in the content generation environment. For example, if the device determines that stylus 308 is pointed at a location in the center of the surface of table 302 in the physical environment, the device is able to determine that stylus 308 is pointed at cube 304 because in content generation environment 300, cube 304 is located at the center of the surface of table 302 (e.g., cube 304 is at the corresponding location in content generation environment 300 at which stylus 308 is pointed). In some embodiments, the representation of hand 306 and the representation of stylus 308 is displayed such that when stylus 308 is determined to be pointing at a respective virtual object, the representation of stylus 308 in content generation environment 300 appears as if it is pointed at the respective virtual object.

Returning to FIG. 3A, the device determines that stylus 308 is not pointed at cube 304 (e.g., stylus 308 is pointed at a location in the physical environment that does not correspond to the location of cube 304 in content generation environment 300, as shown by the dotted arrow). In some embodiments, in response to determining that stylus 308 is not pointed at cube 304, cube 304 is not visually modified to indicate that stylus 308 is pointed at cube 304, as shown in FIG. 3A. For example, cube 304 is displayed with its original, unmodified visual characteristics (e.g., unmodified color, texture, shading, transparency, highlighting, etc.).

In some embodiments, the orientation of stylus 308 is determined using one or more cameras and/or sensors (e.g., depth sensors and/or time-of-flight sensors) of the electronic device. For example, the one or more cameras or sensors of the electronic device can "see" stylus 308 and extrapolate using the orientation of stylus 308 to determine the location and object at which stylus 308 is pointing. In some embodiments, the orientation of stylus 308 is determined using one or more sensors integrated into stylus 308. For example, stylus 308 can include an accelerometer, a gyroscope, and/or any other suitable position and/or orientation sensor. In some embodiments, using information from the sensors in stylus 308 and/or using information from the sensors of the electronic device, the electronic device is able to determine the orientation of stylus 308 (e.g., the direction at which stylus 308 is pointed).

In FIG. 3B, hand 306 has moved and/or rotated such that stylus 308 is directed to cube 304 (e.g., pointed at cube 304). In some embodiments, the device determines that stylus 308 is now pointed at cube 304 and in response to determining that stylus 308 is pointed at cube 304, the visual characteristics of cube 304 is modified to indicate that stylus 308 is pointed at cube 304. In some embodiments, modifying the visual characteristics of cube 304 can include changing a color, texture, shading, and/or transparency of at least a portion of cube 304 and/or highlighting cube 304. For example, in FIG. 3B, cube 304 is displayed with highlighting 310. In some embodiments, highlighting 310 is a halo, glow, shadow, and/or highlighting effect that is displayed around cube 304, thus visually emphasizing cube 304 as compared to other objects in content generation environment 300. In some embodiments, modifying the visual characteristic of cube 304 to include highlighting 310 indicates that stylus 308 is pointed at cube 304, but does not indicate that cube 304 has been selected for input or that manipulation operations are being performed on cube 304 (which will be described in more detail below).

In FIG. 3B, the device detects that hand 306 is performing "Gesture A" while stylus 308 is directed to cube 304 (e.g., with "Gesture A" indicated by the letter "A" in the torus representing hand 306). In some embodiments, "Gesture A" corresponds to a first type of selection gesture, such as a single tap on stylus 308 by a finger of hand 306 (e.g., a forefinger, a thumb, a middle finger, etc.). In some embodiments, a single tap input includes a contact with stylus 308 by a finger for less than a threshold amount of time, such as 0.1 seconds, 0.5 seconds, 1 second, 3 seconds, etc. (e.g., a contact by a finger followed by a lift-off of the finger). In some embodiments, the selection input is detected using one or more sensors (e.g., cameras) of the electronic device, which is able to capture that a finger of hand 306 has performed a single tap on stylus 308 (e.g., the device "sees" the user performing the single tap). In some embodiments, the selection input is detected using one or more sensors of stylus 308 (e.g., which optionally transmits information associated with the input to the electronic device). For example, stylus 308 can include one or more accelerometers, capacitive sensors, and/or any other suitable sensors that are able to detect a tap input. It is understood that Gesture A need not be a single tap gesture, but can be any gesture predetermined to correspond to a selection operation, optionally including taps and/or slides with one or more fingers, movements, and/or rotations of the stylus, etc.

Figure 3C:
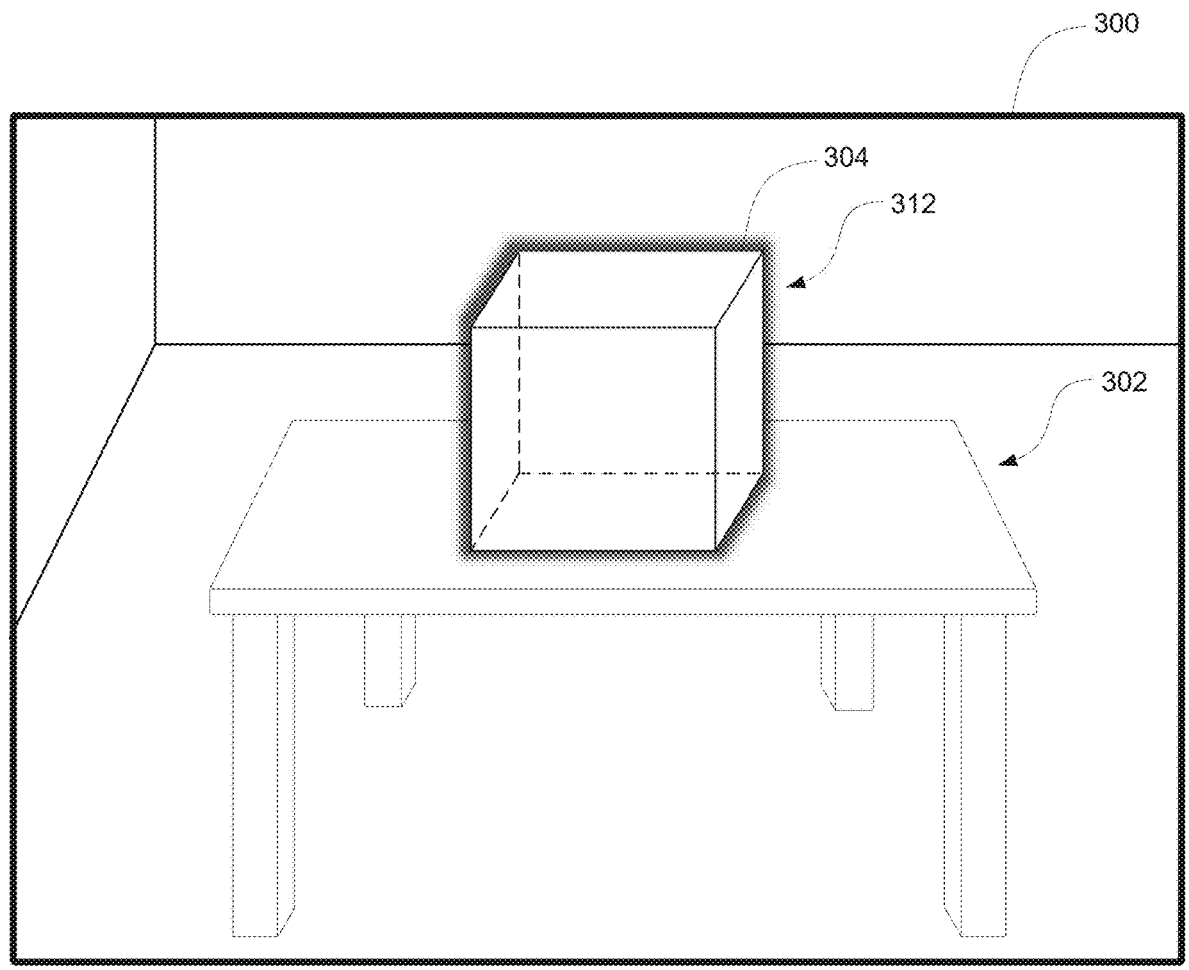

In some embodiments, in response to detecting that hand 306 performed "Gesture A" while stylus 308 is directed to cube 304, cube 304 is selected and visually modified to include highlighting 312 (e.g., optionally removing highlighting 310, or transforming highlighting 310 into highlighting 312), as shown in FIG. 3C. In some embodiments, highlighting 312 is different from highlighting 310 illustrated in FIG. 3B, in either magnitude and/or form. In some embodiments, highlighting 312 is a different type of visual effect from highlighting 310. For example, highlighting 310 may comprise a shading effect while highlighting 312 can comprise a glow effect. In some embodiments, highlighting 312 is the same type of visual effect as highlighting 310, but with an increased value (e.g., greater magnitude, "stronger" effect, etc.). For example, highlighting 312 is a larger and/or thicker halo, a brighter color, more or less transparency, and/or more shading, etc. than highlighting 310. In some embodiments, modifying the visual characteristic of cube 304 to include highlighting 312 indicates that cube 304 has been selected (e.g., selected for input). In some embodiment, selecting cube 304 enables one or more operations to be performed on cube 304. For example, in response to selecting cube 304, the device can display a contextual menu that includes one or more selectable options for performing one or more operations associated with cube 304. For example, the contextual menu can include an option to delete cube 304, an option to copy cube 304 to a clipboard, an option to duplicate cube 304, and/or an option to rotate or resize cube 304, etc.

As shown in FIG. 3C, cube 304 is displayed with highlighting 312 even if stylus 308 is no longer directed to cube 304. Thus, after selecting cube 304, cube 304 remains selected even if the orientation of stylus 308 changes and/or even if stylus 308 is directed to another object. In some embodiments, while cube 304 is selected, if stylus 308 is directed to another object (e.g., such as table 302), the other object is not highlighted (e.g., is not visually modified, such as to include a highlighting similar to highlighting 310). In some embodiments, while cube 304 is selected, if stylus 308 is directed to another object (e.g., such as table 302), the other object is highlighted (e.g., is visually modified to include a highlighting similar to highlighting 310). In some embodiments, while cube 304 is selected, if a selection input of the first type is received while stylus 308 is directed to another object, then in response, the other object is selected (e.g., and displayed with a highlighting similar to highlighting 312), and cube 304 is no longer selected (e.g., and no longer displayed with highlighting 312).

In some embodiments, cube 304 can be de-selected via one or more de-selection mechanisms. For example, in response to another object being selected, cube 304 is de-selected, as described above. In another example, cube 304 can be de-selected in response to a selection of a de-selection affordance, in response to receiving a selection input while stylus 308 is not directed to any object in content generation environment 300, or in response to receiving a second selection input of the first type while stylus 308 is directed to cube 304. In some embodiments, in response to cube 304 being de-selected, cube 304 is visually modified to return cube 304 to its original visual characteristic before cube 304 was selected (e.g., removing highlighting 312). In some embodiments, if stylus 308 remains directed to cube 304 when cube 304 is de-selected, cube 304 optionally is displayed with highlighting 310 (e.g., highlighting 312 is removed, or highlighting 312 is transformed into highlighting 310).

Thus, as described above, based on the orientation of stylus 308, a virtual object (or a physical object or representation thereof) can be highlighted to indicate that stylus 308 is pointed at the virtual object (e.g., and to indicate that user inputs may be directed to the virtual object). For example, if the orientation of stylus 308 is such that stylus 308 is pointed at a first virtual object, then the first virtual object is visually modified to be displayed with highlighting 310, but if the orientation of stylus 308 is such that stylus 308 is pointed at a second virtual object (or a physical object or representation thereof), then the second virtual object is visually modified to be displayed with highlighting 310. In some embodiments, if one virtual object is directly behind another such that stylus 308 is pointed towards both virtual objects, the virtual object that is closer to stylus 308 (e.g., the virtual object which has an unobscured path from stylus 308) is visually modified to be displayed with highlighting 310. In some embodiments, while a virtual object is displayed with highlighting 310 (e.g., while stylus 308 is directed to the virtual object), in response to receiving an input of a first type (e.g., a selection input, such as Gesture A), the virtual object is selected and displayed with highlighting 312.

It is understood that stylus 308 need not necessarily remain pointing at a respective virtual object during the entirety of the selection input. For example, receiving the tap input on stylus 308 can cause stylus 308 to temporarily change orientations such that stylus 308 temporarily points away from the respective virtual object. Thus, in some embodiments, the device can implement a buffer and/or lag time (e.g., a de-bouncing process) such that if stylus 308 is directed to the virtual object within a threshold amount of time before the selection input was received (e.g., 0.1 seconds, 0.5 seconds, 1 second, etc.) and/or stylus 308 moved by less than a threshold amount when the selection input was received (e.g., moved by less than 1 mm, 3 mm, 5 mm, 10 mm, etc.), then the device interprets the selection input as being directed to the virtual object (e.g., as if stylus 308 were pointed at the virtual object when the selection input was received).

It is understood that the above-described method of selecting an object can be performed on virtual objects in content generation environment 300 or real world objects (or representations thereof) that are displayed in content generation environment 300.

Figure 4A:
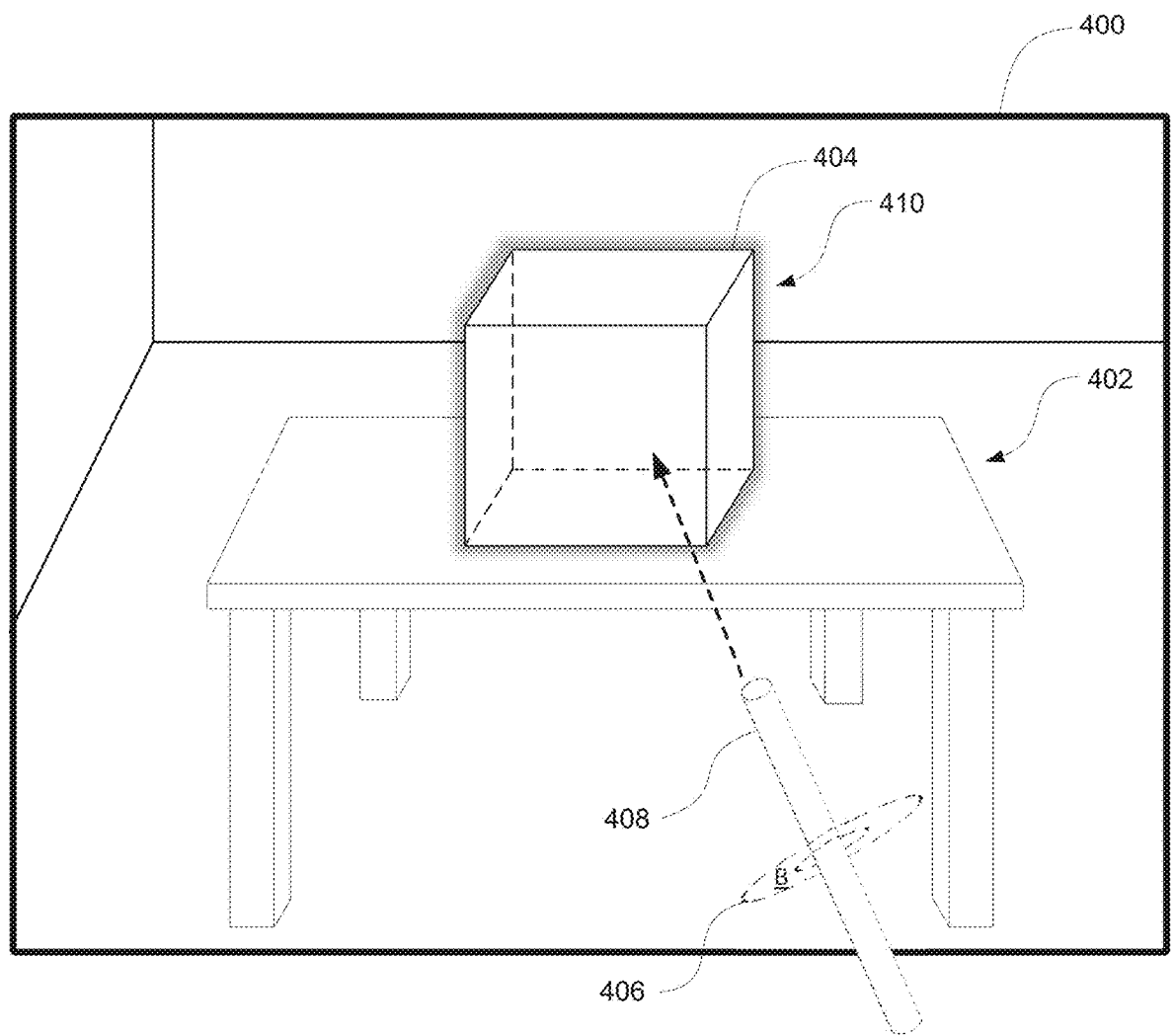
FIGS. 4A-4B illustrate an exemplary method of moving a virtual object according to embodiments of the disclosure.
Figure 4B:
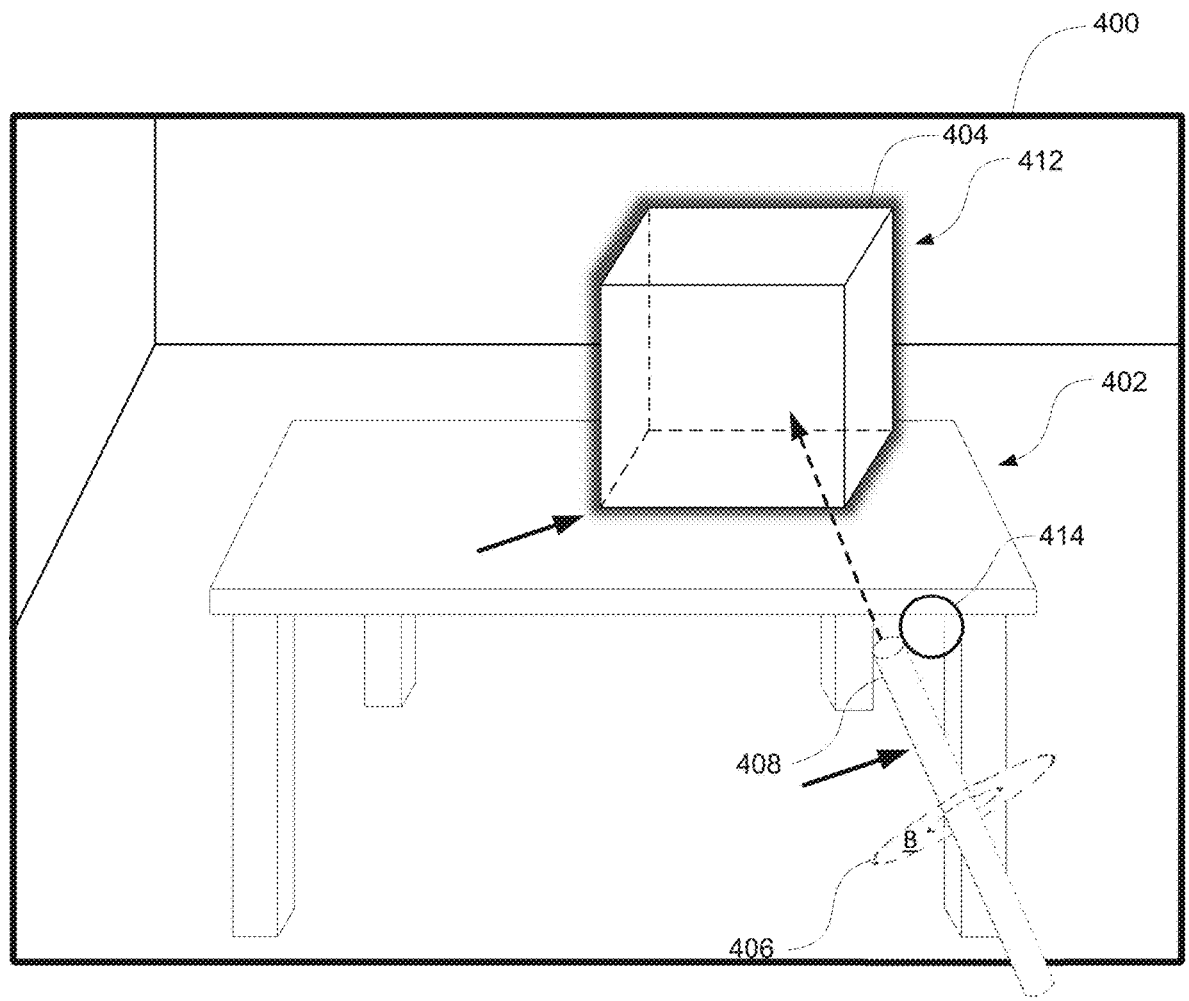

FIGS. 4A-4B illustrate an exemplary method of moving a virtual object according to embodiments of the disclosure. In FIG. 4A, content generation environment 400 can be displayed by an electronic device (e.g., similar to device 100 or 200). In some embodiments, content generation environment 400 is displayed by a display generation component (e.g., a display device) that is in communication with the device (e.g., integrated with or external to the device), such as a monitor, a touch screen, a projector, a television, head-mounted display, etc. In some embodiments, content generation environment 400 is similar to and/or has similar behavior as content generation environment 300 described above with respect to FIGS. 3A-3C.

Content generation environment 400 includes table 402, cube 404, and representations of hand 406 and stylus 408 (e.g., similar to table 302, cube 304, hand 306, and stylus 308, respectively, described above with respect to FIGS. 3A-3C). In FIG. 4A, stylus 408 is pointed at cube 404 and thus cube 404 is displayed with highlighting 410 (e.g., according to the process described above with respect to FIG. 3B).

In FIG. 4A, while stylus 408 is pointed at cube 404, the device detects that hand 406 is performing "Gesture B" (e.g., with "Gesture B" indicated by the letter "B" in the torus representing hand 406). In some embodiments, "Gesture B" corresponds to a second type of selection gesture (e.g., different from Gesture A), such as a single tap-and-hold on stylus 408 by a finger of hand 406 (e.g., a forefinger, a thumb, a middle finger, etc.). In some embodiments, a single tap-and-hold input includes a contact with stylus 408 by a finger, followed by a continued contact with stylus 408 by the finger (e.g., a continued contact of the initial touch-down, without lift-off between the initial touch-down and the continued contact). In some embodiments, the second type of selection gesture corresponds to a request to move cube 404 (e.g., a request to perform a movement operation on cube 404). It is understood that Gesture B need not be a single tap-and-hold gesture, but can be any gesture predetermined to correspond to a movement operation, optionally including taps and/or slides with one or more fingers, movements, and/or rotations of the stylus, etc.

In some embodiments, in response to detecting that hand 406 performed "Gesture B" while stylus 408 is directed to cube 404, cube 404 is selected for movement operations and visually modified to include highlighting 412 (e.g., optionally removing highlighting 410, or transforming highlighting 410 into highlighting 412, via a process similar to described above with respect to FIG. 3C), as shown in FIG. 4B. In some embodiments, the device detects that hand 406 performed "Gesture B" via any of the methods described above in FIGS. 3B-3C with respect to detecting that hand 306 performed "Gesture A".

In some embodiments, highlighting 412 is similar to highlighting 312 described above with respect to FIG. 3C and is a different highlighting effect from highlighting 410 in magnitude and/or form. In some embodiments, cube 404 is displayed with highlighting 412 due to cube 404 being explicitly selected for manipulation operations (e.g., as opposed to stylus 408 merely pointing at cube 404 as in FIG. 4A).

In some embodiments, in addition or alternatively to displaying cube 404 with highlighting 412, in response to detecting that hand 406 performed "Gesture B" while stylus 408 is directed to cube 404, the device displays movement indicator 414, as shown in FIG. 4B (by a representative circle). In some embodiments, movement indicator 414 indicates that a movement operation has been selected and that the movement of hand 406 (and/or stylus 408) will cause cube 404 to move in accordance with the movement of hand 406 (and/or stylus 408). For example, in some embodiments, movement indicator 414 is or includes an icon with crisscrossed arrows that indicates that cube 404 can be moved in any direction (e.g., with four or six arrowheads indicative of four or six degrees of freedom). In some embodiments, movement indicator 414 is partially or fully transparent such that objects in content generation environment 400 that are behind movement indicator 414 can be at least partially visible through movement indicator 414. In some embodiments, movement indicator 414 is opaque such that objects behind movement indicator 414 are obscured by movement indicator 414. In some embodiments, movement indicator 414 is displayed at or near the location of stylus 408 and/or hand 406. In some embodiments, movement indicator 414 is displayed at or near the location of cube 404 (e.g., the virtual object being moved).

In some embodiments, while hand 406 maintains "Gesture B" (e.g., while cube 404 is selected for movement), cube 404 moves in accordance with a movement of hand 406 (and/or movement of stylus 408). For example, in FIG. 4B, the device detects that hand 406 has moved diagonally rightwards and upwards and in response, cube 404 moves diagonally rightwards and upwards. It is understood that cube 404 can move in any direction, with six degrees of freedom (e.g., in the x direction, y direction, or z direction) based on the movement of hand 406 (and/or stylus 408). In some embodiments, cube 404 moves in the same direction, by the same amount, and/or at the same speed as the movement of hand 406 (and/or stylus 408). In some embodiments, cube 404 moves by an amount different than the amount of movement of hand 406. For example, cube 404 can move by a scaled amount of the movement of hand 406 (e.g., the amount of movement by hand 406 scaled by a scaling factor). In some embodiments, the movement of cube 404 can be more (e.g., have a larger scaling factor) if cube 404 is farther away (e.g., a farther z-depth) and less (e.g., have a smaller scaling factor) if cube 404 is closer (e.g., at a closer z-depth).

In some embodiments, while hand 406 maintains Gesture B (e.g., maintains contact with stylus 408 by the finger that performed the tap-and-hold input), cube 404 continues to move in accordance with the movement of hand 406 (and/or stylus 408). In some embodiments, in response to detecting that the contact with stylus 408 by the finger that performed the tap-and-hold gesture has terminated (e.g., termination of Gesture B), the movement operation for cube 404 is terminated and movements of hand 406 (and/or stylus 408) do not cause cube 404 to move in content generation environment 400. In some embodiments, in response to detecting that hand 408 has terminated Gesture B, cube 404 is no longer selected for movement, no longer displayed with highlighting 412, and is optionally reverted to its original visual characteristic (e.g., the visual characteristic that it had before it was modified to be displayed with highlighting 410 and highlighting 412). In some embodiments, if stylus 408 remains pointed at cube 404 when hand 408 terminated Gesture B, then cube 404 is visually modified to include highlighting 410 (e.g., optionally removing highlighting 412 or transforming highlighting 412 into highlighting 410).

Thus, as described above, because the selection input was a second type of selection input, cube 404 is selected for movement operations. In some embodiments, when cube 404 is selected for movement operations, other types of manipulations are not available. For example, while cube 404 is selected for movement operations, rotating hand 406 (and/or stylus 408) does not cause cube 404 to rotate. Similarly, cube 404 optionally cannot be resized while cube 404 is selected for movement operations. Thus, cube 404 is locked into movement operations because the selection input was the second type of selection input.

In some embodiments, cube 404 can be selected for movement operations even if cube 404 is currently selected for input (e.g., in response to a first type of selection input, such as in FIG. 3C). For example, while cube 404 is selected for input (e.g., displayed with highlighting 412 in response to the first type of selection input, such as described in FIG. 3C), in response to detecting a second type of selection input while stylus 408 is directed to cube 404, cube 404 is selected for movement operations.

Figure 5A:
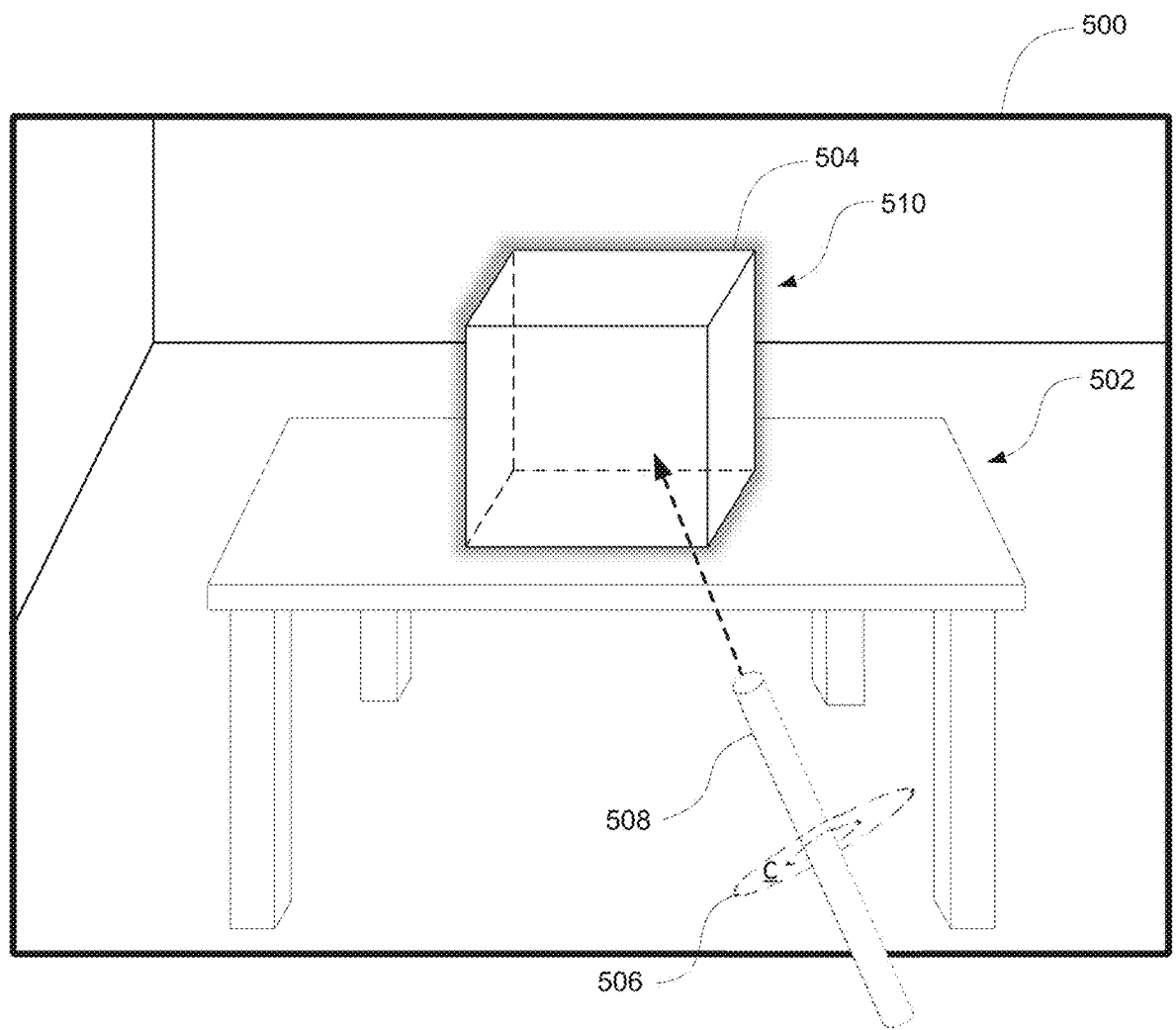
FIGS. 5A-5B illustrate an exemplary method of modifying the orientation of a virtual object according to embodiments of the disclosure.
Figure 5B:
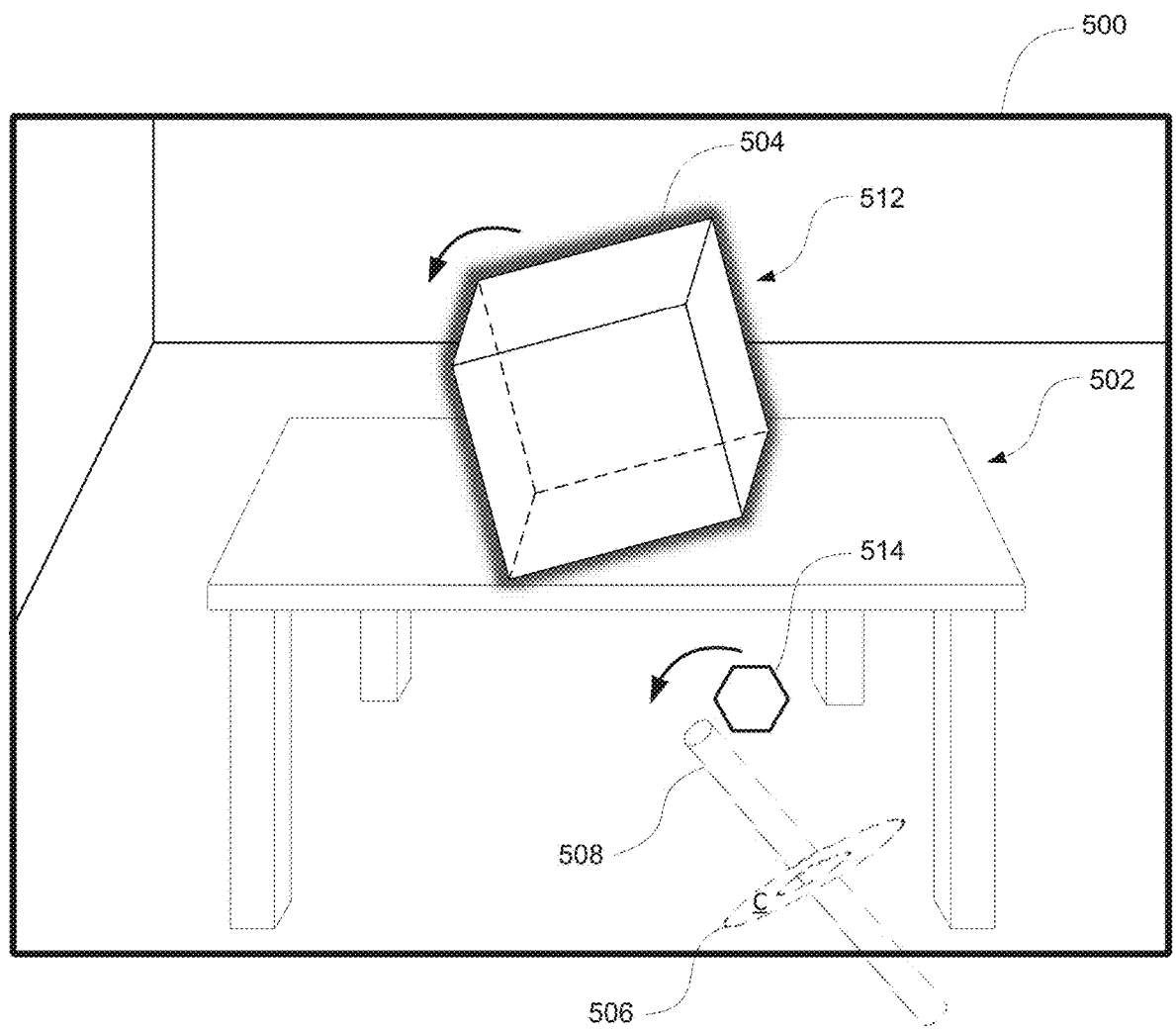

FIGS. 5A-5B illustrate an exemplary method of modifying the orientation of a virtual object according to embodiments of the disclosure. In FIG. 5A, content generation environment 500 can be displayed by an electronic device (e.g., similar to device 100 or 200). In some embodiments, content generation environment 500 is displayed by a display generation component (e.g., a display device) that is in communication with the device (e.g., integrated with or external to the device), such as a monitor, a touch screen, a projector, a television, head-mounted display, etc. In some embodiments, content generation environment 500 is similar to and/or has similar behavior as content generation environment 300 and/or content generation environment 400 described above with respect to FIGS. 3A-3C and FIGS. 4A-4B.

Content generation environment 500 includes table 502, cube 504, and representations of hand 506 and stylus 508 (e.g., similar to table 302, cube 304, hand 306, and stylus 308, respectively, described above with respect to FIGS. 3A-3C). In FIG. 5A, stylus 508 is pointed at cube 504 and thus cube 504 is displayed with highlighting 510 (e.g., according to the process described above with respect to FIG. 3B).

In FIG. 5A, while stylus 508 is pointed at cube 504, the device detects that hand 506 is performing "Gesture C" (e.g., with "Gesture C" indicated by the letter "C" in the torus representing hand 506). In some embodiments, "Gesture C" corresponds to a third type of selection gesture (e.g., different from Gesture A and Gesture B), such as a double tap-and-hold on stylus 508 by a finger of hand 506 (e.g., a forefinger, a thumb, a middle finger, etc.). In some embodiments, a double tap-and-hold input includes a contact with stylus 508 by a finger, a lift-off from stylus 508 by the finger within a threshold time period of the touch-down of the contact (e.g., within 0.1 seconds, 0.5 seconds, 1 second, 3 seconds, etc.) (e.g., a first tap), followed by a second contact with stylus 508 by the finger within a threshold time period of the lift-off (e.g., within 0.1 seconds, 0.5 seconds, 1 second, 3 seconds, etc.) and a continuance of the second contact with stylus 508 by the finger (e.g., a second tap, the contact of which is held). In some embodiments, the third type of selection gesture corresponds to a request to rotate cube 504 (e.g., a request to perform a rotation operation on cube 504). It is understood that Gesture C need not be a double tap-and-hold gesture, but can be any gesture predetermined to correspond to a rotation operation, optionally including taps and/or slides with one or more fingers, movements, and/or rotations of the stylus, etc.

In some embodiments, in response to detecting that hand 506 performed "Gesture C" while stylus 508 is directed to cube 504, cube 504 is selected for rotation and visually modified to include highlighting 512 (e.g., optionally removing highlighting 510, or transforming highlighting 510 into highlighting 512, via a process similar to described above with respect to FIG. 3C), as shown in FIG. 5B. In some embodiments, the device detects that hand 506 performed "Gesture C" via any of the methods described above in FIGS. 3B-3C with respect to detecting that hand 306 performed "Gesture A".

In some embodiments, highlighting 512 is similar to highlighting 312 described above with respect to FIG. 3C and is a different highlighting effect from highlighting 510 in magnitude and/or form. In some embodiments, cube 504 is displayed with highlighting 512 due to cube 504 being explicitly selected for manipulation operations (e.g., as opposed to stylus 508 merely pointing at cube 504 as in FIG. 5A).

In some embodiments, in addition or alternatively to displaying cube 504 with highlighting 512, in response to detecting that hand 506 performed "Gesture C" while stylus 508 is directed to cube 504, the device displays rotation indicator 514, as shown in FIG. 5B (by a representative hexagon). In some embodiments, rotation indicator 514 indicates that a rotation operation has been selected and that a rotation of hand 506 (and/or stylus 508) will cause cube 504 to rotate in accordance with the rotation of hand 506 (and/or stylus 508). For example, in some embodiments, rotation indicator 514 is or includes an icon with curved arrow that indicates that cube 504 can be rotated (e.g., similar to the curved arrow shown in FIG. 5B). In some embodiments, the curved arrow in rotation indicator 514 indicates the direction of the rotation being performed (e.g., a yaw, pitch, or roll rotation) and optionally changes based on how cube 504 is rotating. In some embodiments, rotation indicator 514 is partially or fully transparent such that objects in content generation environment 500 that are behind rotation indicator 514 can be at least partially visible through rotation indicator 514. In some embodiments, rotation indicator 514 is opaque such that objects behind rotation indicator 514 are obscured by rotation indicator 514. In some embodiments, rotation indicator 514 is displayed at or near the location of stylus 508 and/or hand 506. In some embodiments, rotation indicator 514 is displayed at or near the location of cube 504 (e.g., the virtual object being rotated).

In some embodiments, while hand 506 maintains "Gesture C" (e.g., while cube 504 is selected for rotation), cube 504 rotates in accordance with a rotation of hand 506 (and/or rotation of stylus 408). For example, in FIG. 5B, the device detects that hand 506 has rotated counter-clockwise in the roll orientation (e.g., rotating about the z axis) and in response, cube 404 rotates counter-clockwise in the roll orientation (e.g., about the z axis). It is understood that cube 504 can rotate in any direction and in any orientation (e.g., roll, yaw, and/or pitch) based on the rotation of hand 506 (and/or stylus 408). For example, if hand 506 rotated in the yaw orientation (e.g., about the y axis), then cube 504 rotates in the yaw orientation (e.g., about the y axis). In some embodiments, cube 504 rotates in the same direction, by the same amount, and/or at the same speed as the rotation of hand 506 (and/or stylus 508).

In some embodiments, the rotation of cube 504 locks into one rotation orientation. For example, if the rotation of hand 506 is primarily a first type of rotation (e.g., a roll, yaw, or pitch rotation), then cube 504 locks into that type of rotation and does not rotate in other orientations, even if hand 506 also rotates in the other orientations. For example, if the roll component of the rotation of hand 506 has a greater magnitude than the yaw component of the rotation of hand 506 (e.g., and there was no pitch rotation component), then the roll rotation is the primary type of rotation and cube 504 locks into the roll rotation (e.g., only rotates in the roll orientation) in accordance with the roll component of the rotation of hand 506, even if hand 506 also includes yaw and/or pitch rotation components.

In some embodiments, cube 504 does not lock into a particular rotation orientation and is able to rotate in any orientation based on the rotation of hand 506. For example, if the rotation of hand 506 includes roll, yaw, and pitch rotation components, cube 504 rotates in the roll orientation in accordance with the roll component of the rotation of hand 506, in the yaw orientation in accordance with the yaw component of the rotation of hand 506, and in the pitch orientation in accordance with the pitch component of the rotation of hand 506.

In some embodiments, while hand 506 maintains Gesture C (e.g., maintains the contact of stylus 508 by the finger that performed the double tap-and-hold input), cube 504 continues to rotate in accordance with the rotation of hand 506 (and/or stylus 508). In some embodiments, in response to detecting that the contact with stylus 508 by the finger that performed the double tap-and-hold gesture has terminated (e.g., termination of Gesture C), the rotation operation for cube 504 is terminated and rotations of hand 506 (and/or stylus 508) do not cause cube 504 to rotate in content generation environment 500. In some embodiments, in response to detecting that hand 508 has terminated Gesture C, cube 504 is no longer selected for rotation, no longer displayed with highlighting 512 and is optionally reverted to its original visual characteristic (e.g., the visual characteristic that it had before it was modified to be displayed with highlighting 510 and highlighting 512). In some embodiments, if stylus 508 remains pointed at cube 504 when hand 508 terminated Gesture C, then cube 504 is visually modified to include highlighting 510 (e.g., optionally removing highlighting 512 or transforming highlighting 512 into highlighting 510).

Thus, as described above, because the selection input was a third type of selection input, cube 504 is selected for rotation operations. In some embodiments, when cube 504 is selected for rotation operations, other types of manipulations are not available. For example, while cube 504 is selected for rotation operations, moving hand 506 (and/or stylus 508) does not cause cube 504 to move. Similarly, cube 504 optionally cannot be resized while cube 504 is selected for rotation operations. Thus, cube 504 is locked into rotation operations because the selection input was the third type of selection input.

In some embodiments, cube 504 can be selected for rotation operations even if cube 504 is currently selected (e.g., in response to a first type of selection input, such as in FIG. 3C). For example, while cube 504 is selected for input (e.g., displayed with highlighting 512 in response to the first type of selection input, such as described in FIG. 3C), in response to detecting a second type of selection input while stylus 508 is directed to cube 504, cube 504 is selected for movement operations.

Figure 6:
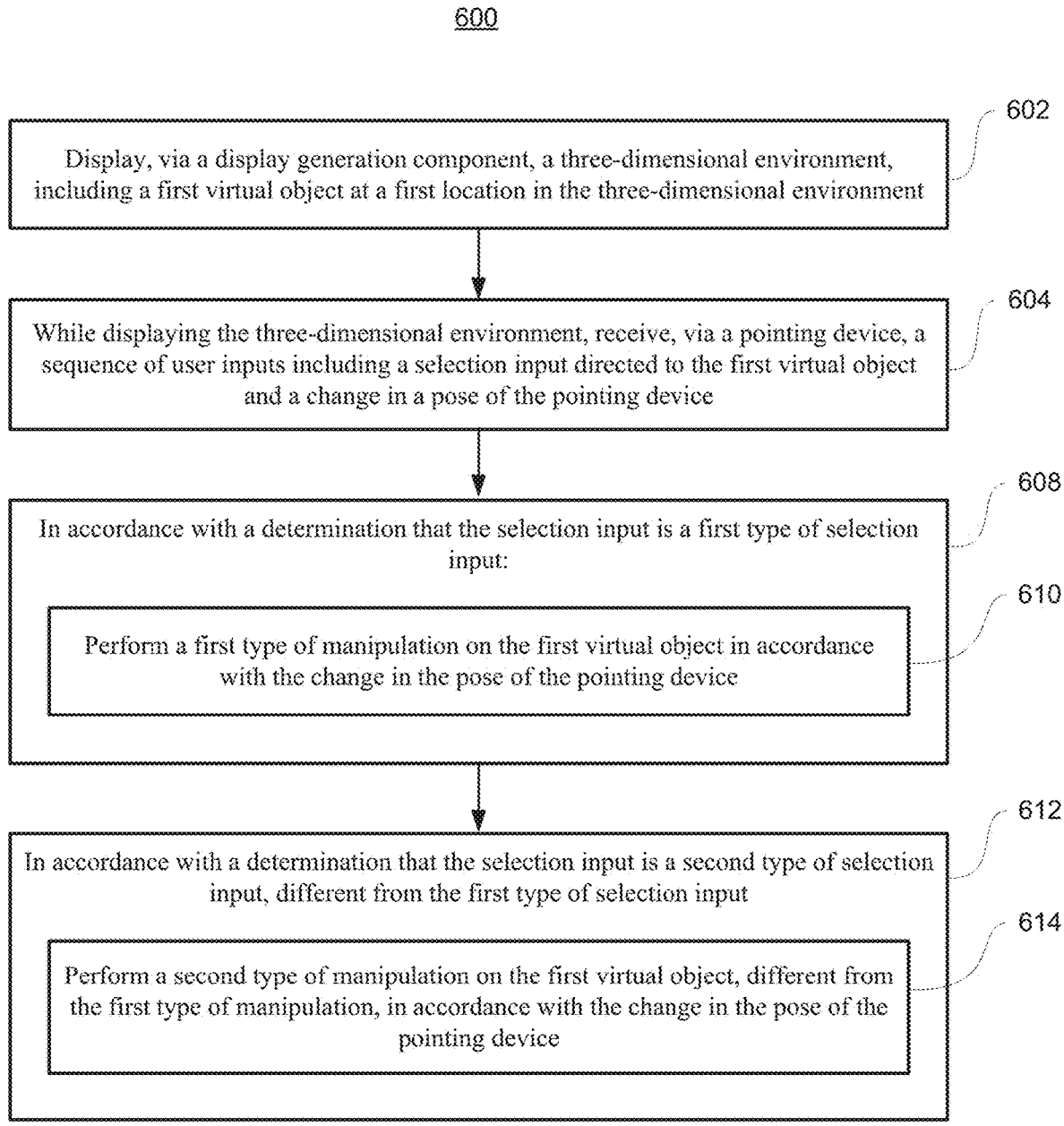
FIG. 6 is a flow diagram illustrating a method of manipulating objects in a three-dimensional environment according to embodiments of the disclosure.

FIG. 6 is a flow diagram illustrating method 600 of manipulating objects in a three-dimensional environment according to embodiments of the disclosure. The method 600 is optionally performed at an electronic device such as device 100, and device 200 when manipulating objects described above with reference to FIGS. 3A-3C, 4A-4B, and 5A-5B. Some operations in method 600 are, optionally combined and/or order of some operations is, optionally, changed. As described below, the method 600 provides methods for manipulating objects in a three-dimensional environment in accordance with embodiments of the disclosure (e.g., as discussed above with respect to FIGS. 3-5).

In some embodiments, an electronic device (e.g., a mobile device (e.g., a tablet, a smartphone, a media player, or a wearable device), a computer, etc. such as device 100 and/or device 200) in communication with a display generation component (e.g., a display integrated with the electronic device (optionally a touch screen display) and/or an external display such as a monitor, projector, television, head-mounted display, etc.) and a pointing device (e.g., a stylus, a pencil, a pen, a pointer, etc.) displays (602), via the display generation component, a three-dimensional environment, including a first virtual object at a first location in the three-dimensional environment, such as cube 304 in content generation environment 300 in FIG. 3A.

In some embodiments, while displaying the three-dimensional environment, the electronic device receives (604), via the pointing device, a sequence of user inputs including a selection input directed to the first virtual object and a change in a pose of the pointing device. For example, in FIGS. 4A-4B, the electronic device detects that hand 406 performed Gesture B corresponding to a first respective type of selection input, and a movement of hand 406, and in FIGS. 5A-5B, the electronic device detects that hand 506 performed Gesture C corresponding to a second respective type of selection input, and a rotation of hand 506.

In some embodiments, in accordance with a determination that the selection input is a first type of selection input (608) (e.g., optionally in response to receiving the sequence of user inputs), the electronic device performs (610) a first type of manipulation on the first virtual object in accordance with the change in the pose of the pointing device. For example, in FIG. 4B, in response to detecting that hand 406 performed the first respective type of selection input (e.g., a single tap-and-hold selection input), cube 404 moves in response to the movement of hand 406.

In some embodiments, in accordance with a determination that the selection input is a second type of selection input (e.g., optionally in response to receiving the sequence of user inputs), different from the first type of selection input (612), the electronic device performs (614) a second type of manipulation on the first virtual object, different from the first type of manipulation, in accordance with the change in the pose of the pointing device. For example, in FIG. 5B, in response to detecting that hand 506 performed the second respective type of selection input (e.g., a double tap-and-hold selection input), cube 504 rotates in response to the rotation of hand 506.

Additionally or alternatively, in some embodiments, performing the first type of manipulation includes moving the first virtual object in accordance with a lateral movement of the pointing device, such as in FIG. 4B. Additionally or alternatively, in some embodiments, performing the second type of manipulation includes rotating the first virtual object in accordance with a rotation of the pointing device, such as in FIG. 5B.

Additionally or alternatively, in some embodiments, the first type of selection input includes a single tap input with a respective finger followed by a continued contact by the respective finger with the pointing device, and the second type of selection input includes a double tap input with the respective finger followed by the continued contact by the respective finger with the pointing device.

Additionally or alternatively, in some embodiments, the change in the pose of the pointing device includes a first type of change in the pose of the pointing device and a second type of change in the pose of the pointing device. Additionally or alternatively, in some embodiments, performing the first type of manipulation includes performing the first type of manipulation on the first virtual object in accordance with the first type of change in the pose of the pointing device, without regard to the second type of change in the pose of the pointing device. Additionally or alternatively, in some embodiments, performing the second type of manipulation includes performing the second type of manipulation on the first virtual object in accordance with the second type of change in the pose of the pointing device, without regard to the first type of change in the pose of the pointing device. For example, if the selection input is the first type of selection input, the manipulation of the object locks into the first type of manipulation and the second type of manipulation is not performed and conversely if the selection input is the second type of selection input, the manipulation of the object locks into the second type of manipulation and the first type of manipulation is not performed.

Additionally or alternatively, in some embodiments, receiving the sequence of user inputs includes detecting the change in the pose of the pointing device via one or more sensors of the pointing device. Additionally or alternatively, in some embodiments, receiving the sequence of user inputs includes detecting the change in the pose of the pointing device via one or more sensors of the electronic device. In some embodiments, a change in the pose of the pointing device (and/or hand) includes a change in the position (e.g., absolute position in physical space or relative position with respect to other objects) and/or a change in the orientation (e.g., a rotation of the pointing device and/or hand).

Additionally or alternatively, in some embodiments, receiving the selection input directed to the first virtual object includes detecting that an orientation of the pointing device is directed to the first virtual object when the selection input was received, such as stylus 408 being pointed at cube 404 when Gesture B was performed in FIG. 4A.

Additionally or alternatively, in some embodiments, the three-dimensional environment includes a second virtual object at a second location in the three-dimensional environment, different from the first location. Additionally or alternatively, in some embodiments, while displaying the three-dimensional environment, the electronic device receives, via the pointing device, a second sequence of user inputs including a second selection input directed to the second virtual object and a second change in a pose of the pointing device. Additionally or alternatively, in some embodiments, in accordance with a determination that the second selection input is the first type of selection input (e.g., optionally in response to receiving the second sequence of user inputs), the electronic device performs the first type of manipulation on the second virtual object in accordance with the second change in the pose of the pointing device. Additionally or alternatively, in some embodiments, in accordance with a determination that the second selection input is the second type of selection input (e.g., optionally in response to receiving the second sequence of user inputs), the electronic device performs the second type of manipulation on the second virtual object, in accordance with the second change in the pose of the pointing device.

Additionally or alternatively, in some embodiments, while displaying the three-dimensional environment, the electronic device detects that an orientation of the pointing device is directed to the first virtual object. Additionally or alternatively, in some embodiments, in response to detecting that the orientation of the pointing device is directed to the first virtual object, the electronic device displays the first virtual object with a first visual characteristic, wherein before detecting that the orientation of the pointing device is directed to the first virtual object, the first virtual object has a second visual characteristic, different from the first visual characteristic. Additionally or alternatively, in some embodiments, in response to receiving the selection input directed to the first virtual object, displaying the first virtual object with a third visual characteristic, different from the first and the second characteristic. For example, in FIG. 3A, when stylus 308 is not pointed at cube 304, cube 304 is visually unmodified, but when stylus 308 is pointed at cube 304 in FIG. 3B, cube 304 is visually modified to have highlighting 310, and when the selection input is received in FIG. 3C, cube 304 is visually modified to have highlighting 312.

Additionally or alternatively, in some embodiments, in accordance with the determination that the selection input is the first type of selection input (e.g., optionally in response to receiving the sequence of user inputs), the electronic device displays, via the display generation component, a first manipulation indication associated with the first type of manipulation, such as movement indicator 414 in FIG. 4B. Additionally or alternatively, in some embodiments, in accordance with the determination that the selection input is the second type of selection input (e.g., optionally in response to receiving the sequence of user inputs), the electronic device displays, via the display generation component, a second manipulation indication, different from the first manipulation indication, associated with the second type of manipulation, such as rotation indicator 514 in FIG. 5B.

Additionally or alternatively, in some embodiments, the three-dimensional environment includes a representation of the pointing device, wherein the representation of the pointing device has an orientation based on an orientation of the pointing device, such as stylus 308 in FIG. 3A.

It should be understood that the particular order in which the operations in FIG. 6 have been described is merely exemplary and is not intended to indicate that the described order is the only order in which the operations could be performed. One of ordinary skill in the art would recognize various ways to reorder the operations described herein.

The operations in the information processing methods described above are, optionally, implemented by running one or more functional modules in an information processing apparatus such as general-purpose processors (e.g., as described with respect to FIG. 2) or application specific chips. Further, the operations described above with reference to FIG. 6 are, optionally, implemented by components depicted in FIG. 2.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

The invention claimed is:

1. A method comprising:
at an electronic device in communication with a display and a pointing device:
  presenting, via the display, a three-dimensional environment, including a first virtual object at a first location in the three-dimensional environment;
  while presenting the three-dimensional environment, receiving, via the pointing device, a sequence of user inputs including a selection input directed to the first virtual object and a change in a pose of the pointing device;
  in accordance with a determination that the selection input is a first type of selection input:
    performing a first type of manipulation on the first virtual object in accordance with the change in the pose of the pointing device; and
  in accordance with a determination that the selection input is a second type of selection input, different from the first type of selection input:
    performing a second type of manipulation on the first virtual object, different from the first type of manipulation, in accordance with the change in the pose of the pointing device, wherein receiving the selection input directed to the first virtual object includes determining, based on an orientation of the pointing device, that the pointing device is directed to the first virtual object when the selection input was received.

2. The method of claim 1, wherein:
performing the first type of manipulation includes moving the first virtual object in accordance with a lateral movement of the pointing device; and
performing the second type of manipulation includes rotating the first virtual object in accordance with a rotation of the pointing device.

3. The method of claim 1, wherein the first type of selection input includes a single tap input with a respective finger followed by a continued contact by the respective finger with the pointing device, and the second type of selection input includes a double tap input with the respective finger followed by a continued contact by the respective finger with the pointing device.

4. The method of claim 1, wherein:
the change in the pose of the pointing device includes a first type of change in the pose of the pointing device and a second type of change in the pose of the pointing device;
performing the first type of manipulation includes performing the first type of manipulation on the first virtual object in accordance with the first type of change in the pose of the pointing device, without regard to the second type of change in the pose of the pointing device; and
performing the second type of manipulation includes performing the second type of manipulation on the first virtual object in accordance with the second type of change in the pose of the pointing device, without regard to the first type of change in the pose of the pointing device.

5. The method of claim 1, wherein receiving the sequence of user inputs includes detecting the change in the pose of the pointing device via one or more sensors of the pointing device.

6. The method of claim 1, wherein receiving the sequence of user inputs includes detecting the change in the pose of the pointing device via one or more sensors of the electronic device.

7. The method of claim 1, wherein the three-dimensional environment includes a second virtual object at a second location in the three-dimensional environment, different from the first location, the method further comprising:
while presenting the three-dimensional environment, receiving, via the pointing device, a second sequence of user inputs including a second selection input directed to the second virtual object and a second change in a pose of the pointing device; and
in accordance with a determination that the second selection input is the first type of selection input:
performing the first type of manipulation on the second virtual object in accordance with the second change in the pose of the pointing device; and
in accordance with a determination that the second selection input is the second type of selection input:
performing the second type of manipulation on the second virtual object, in accordance with the second change in the pose of the pointing device.

8. The method of claim 1, further comprising:
in response to determining that the orientation of the pointing device is directed to the first virtual object, presenting the first virtual object with a first visual characteristic, wherein before determining that the orientation of the pointing device is directed to the first virtual object, the first virtual object has a second visual characteristic, different from the first visual characteristic; and
in response to receiving the selection input directed to the first virtual object, presenting the first virtual object with a third visual characteristic, different from the first visual characteristic and the second characteristic.

9. The method of claim 1, further comprising:
in accordance with the determination that the selection input is the first type of selection input:
presenting, via the display, a first manipulation indication associated with the first type of manipulation; and
in accordance with the determination that the selection input is the second type of selection input:
presenting, via the display, a second manipulation indication, different from the first manipulation indication, associated with the second type of manipulation.

10. The method of claim 1, wherein the three-dimensional environment includes a representation of the pointing device, wherein the representation of the pointing device has an orientation based on the orientation of the pointing device.

11. An electronic device, comprising:
one or more processors;
memory; and
one or more programs, wherein the one or more programs are stored in the memory and configured to be executed by the one or more processors, the one or more programs including instructions for:
presenting, via a display, a three-dimensional environment, including a first virtual object at a first location in the three-dimensional environment;
while presenting the three-dimensional environment, receiving, via a pointing device, a sequence of user inputs including a selection input directed to the first virtual object and a change in a pose of the pointing device;
in accordance with a determination that the selection input is a first type of selection input:
performing a first type of manipulation on the first virtual object in accordance with the change in the pose of the pointing device; and
in accordance with a determination that the selection input is a second type of selection input, different from the first type of selection input:
performing a second type of manipulation on the first virtual object, different from the first type of manipulation, in accordance with the change in the pose of the pointing device,
wherein receiving the selection input directed to the first virtual object includes determining, based on an orientation of the pointing device, that the pointing device is directed to the first virtual object when the selection input was received.

12. The electronic device of claim 11, wherein:
performing the first type of manipulation includes moving the first virtual object in accordance with a lateral movement of the pointing device; and
performing the second type of manipulation includes rotating the first virtual object in accordance with a rotation of the pointing device.

13. The electronic device of claim 11, wherein the first type of selection input includes a single tap input with a respective finger followed by a continued contact by the respective finger with the pointing device, and the second type of selection input includes a double tap input with the respective finger followed by a continued contact by the respective finger with the pointing device.

14. The electronic device of claim 11, wherein:
the change in the pose of the pointing device includes a first type of change in the pose of the pointing device and a second type of change in the pose of the pointing device;
performing the first type of manipulation includes performing the first type of manipulation on the first virtual object in accordance with the first type of change in the pose of the pointing device, without regard to the second type of change in the pose of the pointing device; and
performing the second type of manipulation includes performing the second type of manipulation on the first virtual object in accordance with the second type of change in the pose of the pointing device, without regard to the first type of change in the pose of the pointing device.

15. The electronic device of claim 11, wherein receiving the sequence of user inputs includes detecting the change in the pose of the pointing device via one or more sensors of the pointing device.

16. The electronic device of claim 11, wherein receiving the sequence of user inputs includes detecting the change in the pose of the pointing device via one or more sensors of the electronic device.

17. The electronic device of claim 11, wherein the three-dimensional environment includes a second virtual object at a second location in the three-dimensional environment, different from the first location, the one or more programs further including instructions for:
while presenting the three-dimensional environment, receiving, via the pointing device, a second sequence of user inputs including a second selection input directed to the second virtual object and a second change in a pose of the pointing device; and
in accordance with a determination that the second selection input is the first type of selection input:
performing the first type of manipulation on the second virtual object in accordance with the second change in the pose of the pointing device; and
in accordance with a determination that the second selection input is the second type of selection input:
performing the second type of manipulation on the second virtual object, in accordance with the second change in the pose of the pointing device.

18. A non-transitory computer readable storage medium storing one or more programs, the one or more programs comprising instructions, which when executed by one or more processors of an electronic device, cause the electronic device to:
presenting, via a display, a three-dimensional environment, including a first virtual object at a first location in the three-dimensional environment;
while presenting the three-dimensional environment, receiving, via a pointing device, a sequence of user inputs including a selection input directed to the first virtual object and a change in a pose of the pointing device;
in accordance with a determination that the selection input is a first type of selection input:
performing a first type of manipulation on the first virtual object in accordance with the change in the pose of the pointing device; and
in accordance with a determination that the selection input is a second type of selection input, different from the first type of selection input:
performing a second type of manipulation on the first virtual object, different from the first type of manipulation, in accordance with the change in the pose of the pointing device,
wherein receiving the selection input directed to the first virtual object includes determining, based on an orientation of the pointing device, that the pointing device is directed to the first virtual object when the selection input was received.

19. The non-transitory computer readable storage medium of claim 18, wherein the first type of selection input includes a single tap input with a respective finger followed by a continued contact by the respective finger with the pointing device, and the second type of selection input includes a double tap input with the respective finger followed by a continued contact by the respective finger with the pointing device.

20. The non-transitory computer readable storage medium of claim 18, wherein:
the change in the pose of the pointing device includes a first type of change in the pose of the pointing device and a second type of change in the pose of the pointing device;
performing the first type of manipulation includes performing the first type of manipulation on the first virtual object in accordance with the first type of change in the pose of the pointing device, without regard to the second type of change in the pose of the pointing device; and
performing the second type of manipulation includes performing the second type of manipulation on the first virtual object in accordance with the second type of change in the pose of the pointing device, without regard to the first type of change in the pose of the pointing device.

\* \* \* \* \*